United States Patent
Mazur et al.

(10) Patent No.: US 7,620,281 B2
(45) Date of Patent: Nov. 17, 2009

(54) SUBWAVELENGTH-DIAMETER SILICA WIRES FOR LOW-LOSS OPTICAL WAVEGUIDING

(75) Inventors: Eric Mazur, Concord, MA (US); Limin Tong, Hangzhous (CN); Rafael Gattass, Silver Spring, MD (US)

(73) Assignee: President & Fellows of Harvard College, Cambridge, MA (US)

( * ) Notice: Subject to any disclaimer, the term of this patent is extended or adjusted under 35 U.S.C. 154(b) by 0 days.

(21) Appl. No.: 12/169,173

(22) Filed: Jul. 8, 2008

(65) Prior Publication Data

US 2009/0003783 A1   Jan. 1, 2009

Related U.S. Application Data

(62) Division of application No. 11/013,198, filed on Dec. 15, 2004, now Pat. No. 7,421,173.

(60) Provisional application No. 60/530,467, filed on Dec. 16, 2003.

(51) Int. Cl.
G02B 6/02 (2006.01)
G02B 6/26 (2006.01)

(52) U.S. Cl. .................. 385/123; 385/48
(58) Field of Classification Search .......... 385/123, 385/48
See application file for complete search history.

(56) References Cited

U.S. PATENT DOCUMENTS

| | | | |
|---|---|---|---|
| 6,882,051 B2 * | 4/2005 | Majumdar et al. | 257/746 |
| 6,962,823 B2 * | 11/2005 | Empedocles et al. | 438/3 |
| 6,996,147 B2 * | 2/2006 | Majumdar et al. | 372/43.01 |
| 7,001,669 B2 * | 2/2006 | Lu et al. | 428/613 |
| 7,051,945 B2 * | 5/2006 | Empedocles et al. | 235/492 |
| 7,083,104 B1 * | 8/2006 | Empedocles et al. | 235/491 |
| 7,151,209 B2 * | 12/2006 | Empedocles et al. | 438/689 |
| 7,211,296 B2 * | 5/2007 | Johnson et al. | 427/255.31 |
| 7,332,736 B2 * | 2/2008 | Jin | 257/10 |
| 7,372,880 B2 * | 5/2008 | Jablonski et al. | 372/30 |
| 7,421,173 B2 | 9/2008 | Mazur et al. | |
| 2002/0172820 A1 * | 11/2002 | Majumdar et al. | 428/357 |

(Continued)

OTHER PUBLICATIONS

Tong, et al., "Submicron and nano-diameter silica wires for optical wave guiding," Proceedings of SPIE, vol. 4923, 2002, pp. 52-58,XP002332727, SPIE Press.

(Continued)

*Primary Examiner*—K. Cyrus Kianni
(74) *Attorney, Agent, or Firm*—Thomas J. Engellenner; Reza Mollaaghababa; Nutter McClennen & Fish LLP

(57) ABSTRACT

The present invention provides nanometer-sized diameter silica fibers that exhibit high diameter uniformity and surface smoothness. The silica fibers can have diameters in a range of a about 20 nm to about 1000 nm. An exemplary method according to one embodiment of the invention for generating such fibers utilizes a two-step process in which in an initial step a micrometer sized diameter silica preform fiber is generated, and in a second step, the silica preform is drawn while coupled to a support element to form a nanometer sized diameter silica fiber. The portion of the support element to which the preform is coupled is maintained at a temperature suitable for drawing the nansized fiber, and is preferably controlled to exhibit a temporally stable temperature profile.

9 Claims, 17 Drawing Sheets

U.S. PATENT DOCUMENTS

| | | | |
|---|---|---|---|
| 2002/0175408 A1* | 11/2002 | Majumdar et al. | 257/734 |
| 2003/0044339 A1 | 3/2003 | Barbeau | |
| 2004/0112964 A1* | 6/2004 | Empedocles et al. | 235/491 |
| 2004/0118698 A1* | 6/2004 | Lu et al. | 205/224 |
| 2004/0136866 A1* | 7/2004 | Pontis et al. | 422/57 |
| 2005/0038498 A1* | 2/2005 | Dubrow et al. | 623/1.15 |
| 2005/0161662 A1* | 7/2005 | Majumdar et al. | 257/18 |
| 2005/0164432 A1* | 7/2005 | Lieber et al. | 438/149 |
| 2005/0199731 A9* | 9/2005 | Empedocles et al. | 235/491 |
| 2005/0221072 A1* | 10/2005 | Dubrow et al. | 428/292.1 |
| 2005/0241375 A1* | 11/2005 | Naughton | 73/105 |
| 2006/0038990 A1* | 2/2006 | Habib et al. | 356/301 |
| 2006/0159916 A1* | 7/2006 | Dubrow et al. | 428/357 |
| 2006/0169788 A1* | 8/2006 | Empedocles et al. | 235/492 |
| 2006/0198399 A1* | 9/2006 | Jablonski et al. | 372/10 |
| 2006/0204738 A1* | 9/2006 | Dubrow et al. | 428/292.1 |
| 2006/0237537 A1* | 10/2006 | Empedocles et al. | 235/439 |
| 2006/0284218 A1* | 12/2006 | Kaner et al. | 257/288 |
| 2007/0235340 A1* | 10/2007 | Naughton | 204/667 |

OTHER PUBLICATIONS

Dai, et al, "Aligned silica nanofibres," Journal of Physics: Condensed Matter, vol. 14, No. 25, Jul. 1, 2002, pp. L473-L477, XP002330906, Institute of Physics, GB.

Choi S-S et al: "Silica nanofibers from electrospinning/Sol-gel process," Journal of Materials Science Letters, Chapman and Hall Ltd. London, GB, vol. 22, No. 12, Jun. 15, 2003, pp. 891-893, XP001166787 ISSN: 0261-8028.

Chen Y J et al., "Self-assembly of SI and SIOX Nanostructures," Journal of Materials Science Letters, Chapman and Hall Ltd. London, GB, vol. 21, No. 2, Jan. 15, 2002, pp. 175-177, XP001081543 ISSN: 0261-8028.

Davis, Mark E., "Ordered porous materials for emerging applications," Nature, vol. 417, pp. 813-821 (Jun. 20, 2002).

Zhao, Dongyuan et al., "Triblock copolymer syntheses of mesopourous solica with periodic 50 to 300 angstrom pores," Science, Section No. 5350, vol. 279; p. 548 (Jan. 23, 1998).

Polarz, Sebastian and Smarsly, B., "Nanoporous Materials," Journal of Nanoscience and Nanotechnology, vol. 2, No. 6, pp. 581-612 (American Scientific Publishers 2002).

Ito, T.; Okazaki, S. Nature, 406, 1027 (2000).

Romanato, F.; Cojoc, D.; Di Fabrizio, E.; Galli, M.; Bajoni, D.; J. Vac. Sci. Technol.. B, 21, 291(2003).

Wang, Y. X.; Yun, W. B.; Jacobsen, C. Nature, 424, 50 (2003).

Maier, S. A.; Kik, P. G.; Atwater, H. A., Appl. Phys. Lett., 81, 1714 (2002).

Maier, S. A.; Kik, P.G.; Atwater, HA.; Meltzer, S.; Harel, E.; Koel, B. E.; Requicha, A. A. G., Nature Mater., 2,229 (2003).

Barnes, W. L.; Dereux, A.; Ebbesen, T. W., Nature, 424, 824 (2003).

Law, M.; Sirbuly, D. J.; Johnson, J.C.; Goldberger, J. Saykally, R. J.; Yang, P. D., Science, 305, 1269 (2004).

Barrelet, C. J.; Greytak, A. B.; Lieber, C. M., Nano Lett., 4, 1981 (2004).

Vahala, K. J. Nature 2003, 424, 839.

Abel, A. P.; Weller, M. G.; Duveneck, G. L.; Ehrat, M.; Widmer, H. M., Anal. Chem., 68, 2905 (1996).

Qi, Z. M.; Matsuda, N.; Itoh, K.; Murabayashi, M.; Lavers, C. R., Sensors Actuat. B, 81, 254 (2002).

Prieto, F; Sepulveda. B.; Calle. A.; Llobera, A.; Dominguez, C.; Lechuga, L. M., Sensors Actuat. B, 92, 151 (2003).

Tong, L. M.; Gattass, R. R.; Ashcom, J. N. et al., "Subwavelength-diameter silica wires for low-loss optical wave guiding," Nature, 426, 816-819 (2003).

Domachuk, P.; Eggleton, B. J.; "Photonics: Shrinking optical fibres," Nature Materials, 3, 85-86 (2004).

Matthewson, M. J.; Kurkjian, C. R., J. Am. Ceram. Soc., 70, 662 (1987).

Annovazzi-Ledi, V.; Donati, S.; Merlo, S.; Zapelloni, G., J. Lightwave Technol., 15, 288 (1997).

Snyder, A. W.; Love, J. D., Optical waveguide theory; Chapman and Hall: New York, 1983.

Tong, L. M.; Lou, J. Y.; Mazur, E., "Single-mode guiding properties of subwavelength-diameter silica and silicon wire waveguides," Optics Express, 12, 1025-1035 (2004).

Taflove, A., Computational Electrodynamics: The Finite-difference Time-domain Method; Artech House: Boston, 1995.

Pierre, A. C.; Pajonk, G. M., Chem. Rev., 102, 4243 (2002).

Akimov, Y. K., Instrum. Exp. Tech., 46, 287 (2003).

Joannopoulos, J. D.; Meade, R. D.; Winn, J. N., Photonic Crystals: Molding the Flow of Light; Princeton University Press: Princeton, 1995.

Moosburger J.; Kamp, M.; Forchel, A.: Oliver, S.; Benisty, H.; Weisbuch, C.: Oesterle, U., Appl. Phys. Lett., 79, 3579 (2001).

Augustin, M.; Fuchs, H. J.; Schelle, D.; Kley, E. B.; Nolte, S.; Tunnermann, A.; Iliew, R.; Etrich, C.; Peschel, U.; Lederer, F.; Appl. Phys. Lett., 84, 663 (2004).

Palik, E. D., Handbook of optical constants of solids; Academic Press: New York, 1998.

Brambilla, G.; Finazzi, V.; Richardson, D. J., Opt. Express, 12, 2258 (2004).

Lize, Y. K.; Magi, E. C.; Ta'eed, V. G.; Bolger, J. A.; Steinvurzel, P.; Eggleton, B. J., Opt Express, 12, 3209 (2004).

Brambilla, G.; Finazzi, V.; Richardson, D. J., "Ultra-low-loss optical fiber nanotapers," Optics Express, 12, 2258-2263 (2004).

Yu, D. P.; Hang, Q. L.; Ding, Y. et al., "Amorphous silica nanowires: Intensive blue light emitters," Applied Physics Letters, 73, 3076-3078 (1998).

Wang, Z. L.; Gao, R. P. P.; Gole, J. L.; Stout, J. D., "Silica nanotubes and nanofiber arrays," Advanced Materials, 12, 1938-1940 (2000).

Wang Z. L., "Functional oxide nanobelts: Materials, properties and potential applications in nanosystems and biotechnology," Annual Review of Physical Chemistry, 55, 159-196 (2004).

Pan, Z. W.; Dai, A. R.; Ma, C.; Wang, Z. L., "Molten gallium as a catalyst for the large-scale growth of highly aligned silica nanowires," Journal of the American Chemical Society, 124, 1817-1822 (2002).

Wang, J. C.; Zhan, C. Z. ; Li, F. G., "Silica nanowire arrays," Solid State Communications, 125, 629-631 (2003).

Sun, S. H.; Meng, G. W.; Zhang, M. G. et al., "Preparation and characterization of oriented silica nanowires," Solid State Communications, 128, 287-290 (2003).

Zhu, T.; Li, J.; Yip, S.; Bartlett, R. J.; Trickey, S. B.; De Leeuw, N. H., "Deformation and fracture of a $SiO_2$ nanorod," Molecular Simulation, 29, 671-676 (2003).

Brow, R. K.; Lower, N. P.; Lang, A. J.; Kurkjian, C. R., "Structure and the intrinsic strength of glass," Glass Science and Technology, 85, 133-138 (2002).

Bansal, N. P. And Doremus, R. H., Handbook of Glass Properties; Academic Press: Orlando, 1986.

* cited by examiner

SUBWAVELENGTH-DIAMETER SILICA WIRES FOR LOW-LOSS OPTICAL WAVEGUIDING

RELATED APPLICATION

The present application is a divisional application of U.S. patent application Ser. No. 11/013,198, which was filed on Dec. 15, 2004, and is herein incorporated by reference. This application claims priority to a provisional application entitled "Subwavelength-diameter silica wires for low-loss optical waveguiding" having a Ser. No. 60/530,467 and filed on Dec. 16, 2003.

FEDERALLY SPONSORED RESEARCH

The invention was made with Government support under contract PHY-0117795 awarded by National Science Foundation (NSF). The Government has certain rights in the invention.

BACKGROUND OF THE INVENTION

The present invention relates generally to silica wires having sub-micrometer or nanometer-sized diameters, and methods for forming such wires, and more particularly, to fabrication methods that provide nano-sized silica wires having enhanced uniformity and surface smoothness.

Miniature silica waveguides with diameters or widths larger than the wavelength of transmitted light are widely utilized in optical communications, sensors, and other applications. Silica wires with diameters more than one micrometer, which allow multimode waveguiding of visible and infrared radiation, can be made by drawing high-purity glass fibers from a laser-heated melt. Although photonic applications can benefit from incorporation of silica submicrometer- or nanometer-diameter wires (SMNW), the fabrication of such silica wires presents a number of challenging problems. In particular, both theoretical and experimental results indicate that the laser power required for drawing silica SMNWs with a uniform diameter from a laser-heated melt is impractically large. Further, it is difficult to draw SMNWs having uniform diameters from a flame-heated melt because turbulence and convention render controlling the temperature gradient in the drawing region problematical. Moreover, silica nanowires obtained recently by employing other methods exhibit large diameter fluctuations and sidewall roughness that render these wires unsuitable for low-loss optical waveguiding.

Hence, there is a need for silica fibers having submicrometer- or nanometer diameters that exhibit enhanced diameter uniformity and surface smoothness.

There is also a need for methods that allow fabrication of such silica fibers.

SUMMARY OF THE INVENTION

Silica fibers having average cross-sectional diameters in a range of about 20 nm to about 1000 nm, methods for their fabrication as well as microphotonic devices incorporating them, are disclosed. The silica fibers, which exhibit a high degree of diameter uniformity, can be assembled over a substrate having an index of refraction less than about 1.4, and preferably less than about 1.1, for incorporation in a variety of microphotonic devices.

In one aspect, the present invention provides a method of fabricating a nano-sized optical fiber that includes thermally coupling a silica ($SiO_2$) preform, shaped as a fiber having an average diameter in a range of about 1 to about 20 micrometers, to a support element. The preform is maintained at a temperature below its melting point but high enough to permit its deformation, e.g., a plastic deformation, in response to a tensile force applied thereto. A nano-sized fiber, having an average diameter in a range of about 50 nm to about 1000 nm, is then drawn from the preform.

In a related aspect, a selected portion of the support element is heated to maintain the portion of the support element thermally coupled to the preform, and consequently the preform, at a desired temperature. Preferably, a substantially steady temperature profile, i.e., a temperature profile that is temporally stable at least over the time period required for drawing the nanosized fiber, is established across the portion of the support element that is coupled to the preform. Further, although the temperature across this portion of the preform is preferably substantially uniform, it can exhibit a temperature gradient, albeit preferably a temporally stable gradient, with a maximum temperature variation in a range of about 50 to about 200 C.

A variety of materials, such as, sapphire, diamond, and $Y_2O_3$—$ZrO_2$, can be employed for forming the support element. In general, the support element preferably exhibits a melting temperature higher than the melting temperature of the silica wire, e.g., a melting temperature higher than about 1800 C. In addition, the support element preferably has a heat capacity that is sufficiently high to substantially inhibit transfer of temperature fluctuations in the heated portion of the support element to the portion to which the preform is coupled, at least during the time required for drawing the nanosized fiber. For example, the support element can have a heat capacity in a range of about 0.5 to about 2.5 J/gK.

In another aspect, the size of the portion of the support element coupled to the preform and its distance from the heated portion of the support element, together with judicious selection of the material forming the support element, allow the portion coupled to the preform to function as a thermal reservoir element that ensures a steady temperature distribution across the drawing region by reducing the rate of transfer of temporal fluctuations in the temperature of the heated portion to the drawing region.

In one aspect, the support element can be a tapered sapphire rod extending from a base portion to a tip portion to which the silica preform can be coupled. For example, the silica preform can be wrapped around the tip portion while the tip portion is heated, for example, by placing a selected segment of the sapphire rod in a flame. The tip portion is preferably heated to a temperature that is sufficiently high to cause softening of the preform, thereby facilitating its coupling to the support element. Subsequently, the preform can be drawn to generate the nano-sized silica fiber.

A variety of heating sources can be employed for maintaining the temperature of the drawing region at a desired value. For example, flames of $CH_3OH$ or $C_2H_5OH$ can be employed. Alternatively, electrical heating elements can be utilized for this purpose.

In other aspects, the invention provides an optical fiber that includes a silica wire having an average diameter in a range of about 20 nm to about 1000 nm, or in range of about 20 nm to about 500 nm, or in a range of about 20 nm to about 100 nm, or in a range of about 20 nm to about 50 nm. Such a silica wire is also herein referred to as silica nanowire, a nano-sized silica wire or a silica submicrometer- or nanometer-diameter wire (SMNW). A ratio of maximum variation of the fiber's diameter over a length of the silica fiber ($\Delta D/L$) can be less than about $10^{-3}$, or preferably less than $2\times 10^{-5}$, or more preferably less than about $2\times 10^{-6}$. Further, the silica wire can exhibit a smooth sidewall with a root-mean-square roughness less than about 0.5 nm, and more preferably less than about 0.2 nm. Moreover, the silica wire can have a length in a range of about 1 micron to about 100 millimeters.

The silica nanowire can be doped with a selected dopant, such as, $Er^{+3}$, $Nd^{+3}$ or $Yb^{+3}$ ions, or any other suitable dopant. Such doped silica nanowires can be employed in a variety of microphotonic applications, as discussed in more detail below. Moreover, the silica optical fiber can exhibit a tensile strength in a range of about 2.5 to about 5.5 GPa.

In other aspects, the invention provides a microphotonic device having a substrate with an index of refraction less than about 1.4, and one more silica nanowires having an average diameter in a range of about 20 nm to about 1000 nm (or in range of about 20 nm to about 500 nm, or in a range of about 20 to about 100 nm, or in a range of about 20 nm to about 50 mm) that are assembled over the substrate. The index of refraction of the substrate can be, for example, in a range of about 1 to about 1.4, or in a range of about 1 to about 1.3, or in a range of about 1 to about 1.2, or in a range of about 1 to about 1.1, or in range of about 1 to about 1.05. For example, the substrate can be formed of silica aerogel having an index of refraction of about 1.03.

In a related aspect, a microphotonic branch coupler is disclosed having a substrate with an index of refraction less than about 1.4, e.g., in a range of about 1 to about 1.4 or in a range of about 1 to about 1.3 or in a range of about 1 to about 1.2 or in a range of about 1 to about 1.1, and two silica nanowires having average diameters in a range of about 20 nm to about 1000 nm that are mounted on the substrate. The substrate can be, for example, a silica aerogel substrate. The silica nanowires are assembled on the substrate so as to have longitudinal (length-wise) contact over a selected distance such that a fraction of radiation originally guided by one fiber is coupled to the other fiber while the remaining radiation continues its propagation in the original radiation-guiding fiber. The coupling distance between the two fibers can be in a range of about 1 micrometer to about 100 micrometers, and typically in a range of about 2 micrometers to about 4 micrometers.

In other aspects, the invention provides a microphotonic coupler that includes a substrate (e.g., silica aerogel) having an index of refraction less than about 1.4 (e.g., in a range of about 1 to 1.1) and two silica fibers that are assembled on the substrate. Each fiber has a proximal end and a distal end and an average diameter in a range of about 20 nm to about 1000 nm. A distal portion of one fiber is in length-wise contact with a proximal portion of the other fiber such that radiation guided by one fiber can couple to the other at the contact. The contact portion can provide an overlap in a range of about 1 micron to about 100 microns (e.g., in a range of about 2 to about 4 microns) between the two fibers.

In yet another aspect, the invention provides a method of forming a nano-sized fiber that includes the steps of thermally coupling a proximal portion of a silica fiber having a diameter in a range of about 1 to about 20 microns to a tip portion of a thermally conductive support element such that another portion of the fiber extends vertically down from the tip portion of the support element. The support element can be heated at a selected distance from the tip portion so as to raise the temperature of the tip portion (e.g., to a temperature in a range of about 1500 C to about 1800 C) so as to soften the fiber portion coupled to the support element. A gravitational pull generated by the vertically extending fiber portion causes drawing of the fiber into a wire having a diameter in a range of about 20 nm to about 1000 nm.

Further understanding of the invention can be obtained by reference to the following detailed description in conjunctions with the associated drawings, described briefly below.

DETAILED DESCRIPTION

The present invention provides nanometer-sized diameter silica fibers, and methods for their production, that exhibit a high uniformity in diameter size along the fiber's length as well as a highly smooth surface with a root mean square roughness that can be less than about 0.5 mm. As discussed in more detail below, an exemplary method of the invention for generating such silica fibers utilizes a process in which a silica fiber preform having a micrometer-sized diameter is thermally coupled to a portion of a support element. The support element is heated so as to maintain the fiber at a temperature that allows drawing the preform in a subsequent step to form a nanometer-sized diameter silica fiber.

Figure 1:
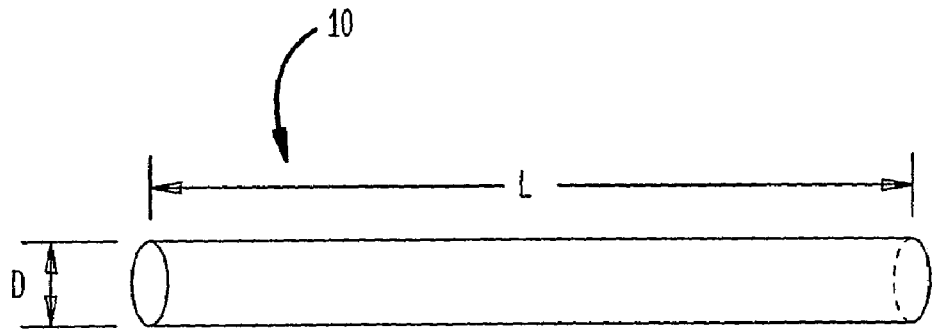
FIG. 1 schematically depicts a silica fiber formed in accordance with the teachings of the invention having a cross-sectional diameter in a range of about 50 nm to about 1 micrometer.

FIG. 1 schematically depicts an exemplary silica fiber 10, formed in accordance with the teachings of the invention, that exhibits a cross-sectional diameter D with a value in a range of about 50 nm to about 1100 nm, or in some preferred embodiments in a range of about 20 nm to about 1100 nm, and a length L with a value in a range of about 1 millimeter to about 100 millimeters. The silica nanowires can also be cut into smaller lengths, even down to about 1 micron, as discussed in more detail below. The ratio of maximum variation of the cross-sectional diameter D at different locations along the fiber relative to the fiber's length, i.e., $\Delta D/L$, can be as low as $10^{-3}$, or $2\times10^{-5}$, and more preferably as low as $2\times10^{-6}$. The illustrative silica fiber can also exhibit high surface uniformity. For example, the root mean square of the roughness of the surface, i.e., root mean square of variations of surface topography about an average value, can be less than about 0.5 nm, or less than about 0.2 nm.

Figure 2:
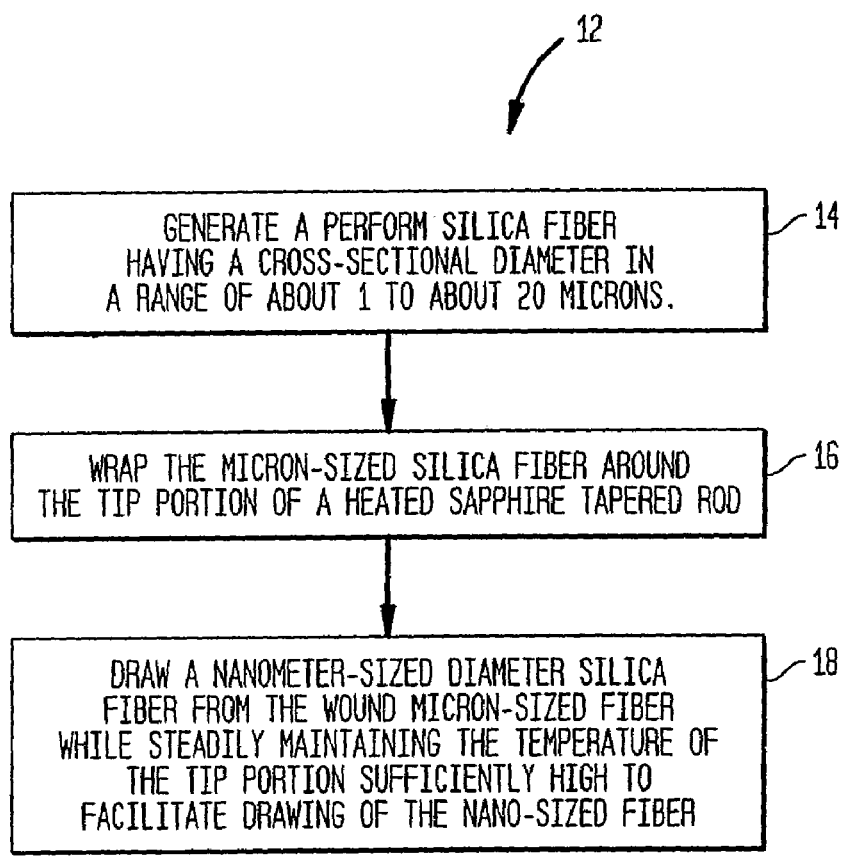
FIG. 2 is a flow chart delineating various steps in an exemplary method according to one embodiment of the invention for fabricating nanometer-sized diameter silica fibers, FIG. 3A schematically illustrates one exemplary method for fabricating silica fiber preforms having micrometer-sized diameters, FIG. 3B schematically illustrates another method for fabricating silica fiber preforms having micrometer-sized diameters, FIG. 4A schematically depicts a second step in a fabrication method according to the teachings of the invention for generating silica submicrometer- or nanometer wires, FIG. 4B schematically illustrates drawing a nanosized fiber from a preform in a fabrication method depicted in FIG. 4A, FIG. 5 schematically depicts a fabrication method in accordance with another embodiment of the invention in which an electric heater is employed for heating a support element to which a silica preform is coupled.
Figure 3A:
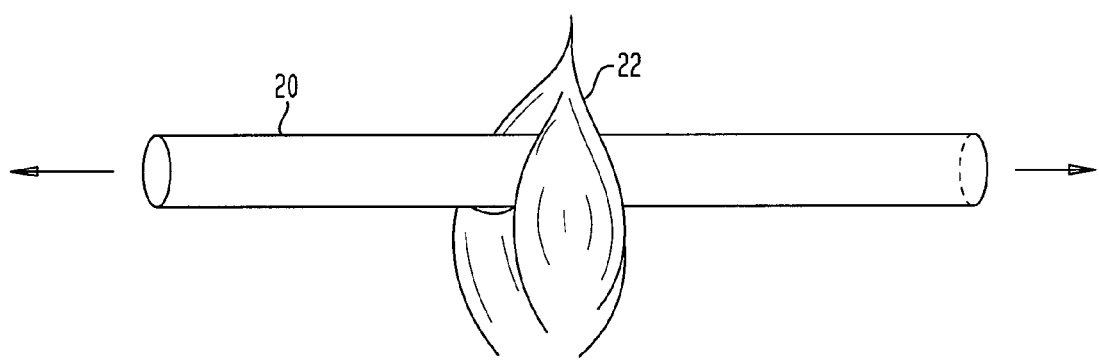
Figure 3B:
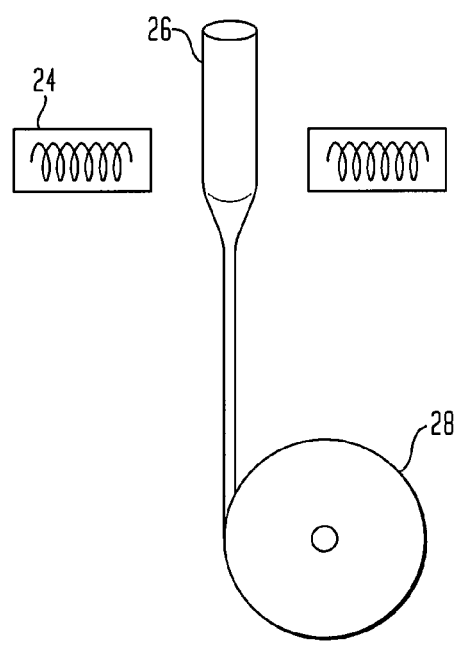

With reference to a flow chart 12 of FIG. 2, in an exemplary method for generating a silica fiber according to one embodiment of the invention, in an initial step 14, a preform silica fiber having a cross-sectional diameter in a range of about 1 micrometer to a few tens of micrometers, e.g., 20 micrometers, is generated. A variety of techniques are known in the art for forming such micrometer-sized silica fibers. For example, with reference to FIG. 3A, in one such method, a portion of a silica fiber 20 having a diameter of a few hundred micrometers, e.g., a glass fiber commercially available from Corning Inc. of N.Y., U.S.A. under trade designation SMF-28, is heated by a flame after the buffer layer is stripped off, e.g., a flame 22 of $CH_3OH$, to an elevated temperature, e.g., a temperature in a range of about 1600 C to 1800 C, that causes softening of the heated portion. The heated fiber is then pulled to form a smaller diameter fiber having a diameter in a range of a few micrometers, e.g., 1 to 20 micrometers. Other methods for generating a micrometer-sized diameter fiber are also known. For example, an article entitled "Carbon dioxide laser fabrication of fused fiber coupled and taper," authored by T. Dimmick, G. Kakarantzas, T. Birks, and P. Russel, published in Applied Optics, Nov. 20, 1999, page 6845, and herein incorporated by reference, describes the use of a $CO_2$ laser as a heat source for forming fiber tapers having micrometer-sized diameters. Alternatively, as shown in FIG. 3B, an electric heater 24 can be utilized to heat a starting fiber 26 having a diameter of a few hundred micrometers to a temperature sufficiently elevated, e.g., glass transition temperature, that allows drawing a micrometer-sized diameter fiber, e.g., by utilizing a spool 28, from the heated starting fiber.

Figure 4A:
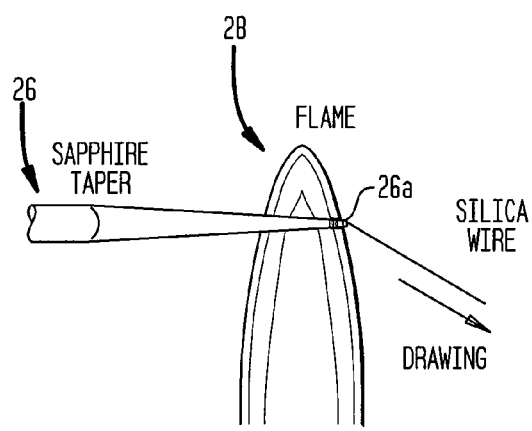

Referring now to the flow chart 12 as well as FIG. 4A, in step 16, the micrometer-sized silica preform fiber is wound around a tip portion 26a, having an average diameter of about 100 micrometers in this embodiment, of a heated tapered sapphire rod 26. The winding of the silica preform fiber can be achieved while the sapphire rod is heated, for example, by a flame 28, by placing one end of the micrometer-diameter silica wire horizontally on the sapphire rod's tip, and rotating the rod about its axis of symmetry to wind the silica wire around the tip. The winding of the silica preform can be performed within the flame or slightly outside of the flame so long as the temperature at the tip portion is sufficiently high, e.g., in a range of about 1500 to 1800 C, to cause at least some softening of the preform, thereby facilitating its winding around the sapphire tip. When the temperatures within the flame are close or above the melting temperature of the preform, if the winding is performed with the tip portion within the flame, the winding rate is preferably sufficiently fast to inhibit any substantial melting of the preform.

Figure 4B:
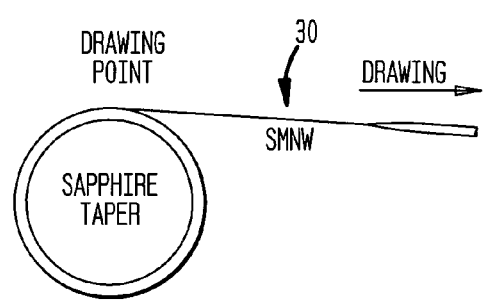

With continued reference to the flow chart 12 as well as FIG. 4B, in a subsequent step 18, the wound preform can be drawn perpendicular to the longitudinal axis of the sapphire rod in a horizontal plane at a rate of about 1 to about 10 mm/sec to form a nanometer-sized diameter silica fiber 30, such as the silica fiber schematically shown in FIG. 1 above. More particularly, in this embodiment, initially, the tip portion, with the silica preform wrapped around it, is positioned at a selected distance, e.g., at a distance of about 0.5 mm, from the edge of the flame. The flame 28 is adjusted until the temperature of the tip portion is below the melting temperature of the silica preform, but sufficiently elevated to allow plastic deformation of the preform in response to a tensile force. For example, the average temperature of tip portion can range from about 1500 C to about 1800 C. In this embodiment, the temperature of the tip portion is set at about 1600 C, which is slightly below the melting temperature of the silica preform, i.e., 1800 C.

In this embodiment, the flame 28 is generated by employing methyl alcohol (a $CH_3OH$ torch with a nozzle diameter of about 6 mm). In other embodiments, other suitable compounds, such as ethyl alcohol ($C_2H_5OH$), can also be employed. In general, it is preferable to choose a compound with a low carbon atom constituency to avoid deposition of carbon from the flame onto the preform being drawn.

Although the temperature profile across the heated tip portion of the sapphire rod, i.e., the portion coupled to wound preform, is preferably substantially uniform, in many embodiments, a temperature gradient with a maximum temperature variation in a range of about 50 C to about 200 C is present across the tip portion. This temperature profile or gradient is, however, controlled to remain substantially steady, that is, temporally stable, at least during the time period required for drawing the nano-sized fiber. In other words, the sapphire tip portion functions as a thermal reservoir element that responds very slowly, at least over the time period required for drawing the nano-sized fiber, to temperature fluctuations that may occur in the flame, hence ensuring temporal stability of the temperature profile across the wound preform. Such temperature stability of the preform during the drawing process in turn helps provide diameter size uniformity and high smoothness of the drawn nano-sized fiber.

Although a sapphire tapered rod was employed in the above embodiment, other materials can be utilized in other embodiments to form a support element to which a silica preform fiber can be coupled. In general, materials suitable for forming the support element preferably exhibit a sufficiently high melting temperature, e.g., a melting temperature higher than 1800 C, to withstand a rise in temperature sufficient for drawing the preform (e.g., a refractory material). In addition, the heat capacity of such materials is preferably sufficiently high such that the portion of the support element coupled to the silica preform can be held at a steady temperature even in case of rapid fluctuations, i.e., fluctuations occurring over a time scale shorter than the drawing time, in the heating provided by a heat source, e.g., a flame. For example, the heat capacity of the support element can be in a range of about 0.5 to about 2.5 J/gK. Some examples of materials other than sapphire suitable for forming the support element include diamond and a $Y_2O_3$—$ZrO_2$ crystal.

Figure 5:
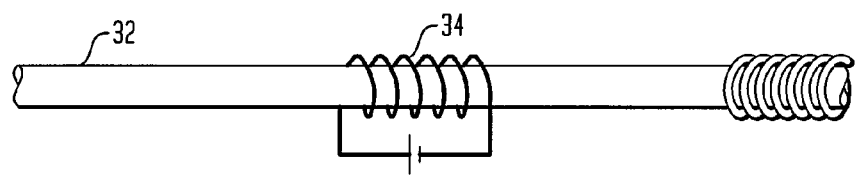

A two-step fabrication method according to the above embodiment of the invention in which a nano-sized diameter fiber is drawn from a preformed micro-sized silica fiber while maintaining a substantially steady temperature distribution in the drawing region can be performed by utilizing techniques other than that described above. For example, with reference to FIG. 5, in another embodiment, a micrometer-sized silica preform is coupled to a support element 32, e.g., a sapphire rod, that is heated by an electric heating element 34. The heated silica preform can then be drawn to generate a nano-sized diameter silica fiber.

Figure 6:
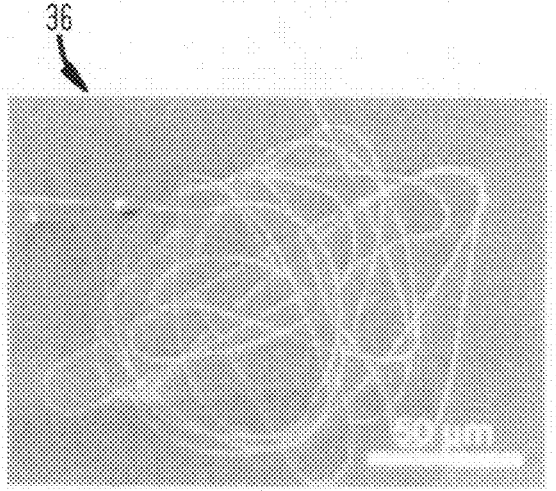
FIG. 6 is an electron micrograph of a nanometer-sized diameter silica wire formed in accordance with the teachings of the invention.

The technique described in the first embodiment above (FIGS. 4A and 4B) can be employed to obtain silica submicrometer- or nanometer diameter wires (SMNW) with diameters as small as 50 nm and lengths up to tens of millimeters. By way of example, FIG. 6 shows a scanning electron microscope (SEM) image 36 of 4-mm long silica wire (the wire is coiled up for more facile presentation of its length) according to the teachings of the invention having a diameter of 260 nm.

Figure 7:
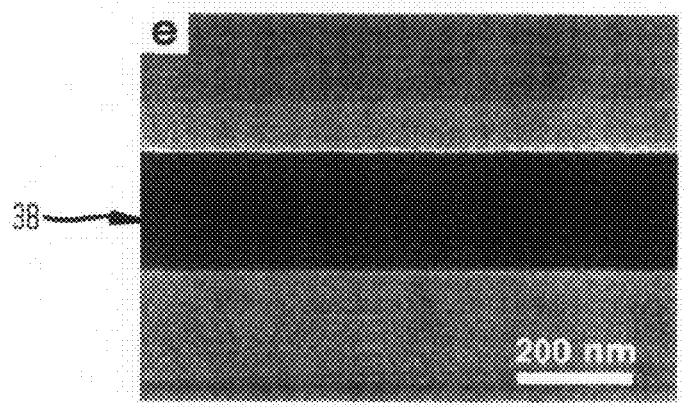
FIG. 7 is a TEM image of a 240-nm diameter silica wire formed in accordance with the teachings of the invention at a magnification of 200,000.
Figure 8:
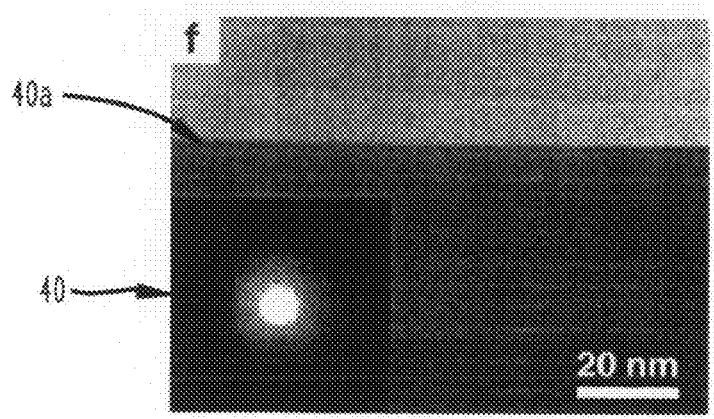
FIG. 8 is a TEM image of the sidewall of a 330-nm diameter silica wire formed in accordance with the teachings of the invention obtained at a magnification of 700,000.

Further, FIGS. 7 and 8, which are, respectively, high-magnification transmission electron microscope (TEM) images of a 240-nm diameter silica wire (at a magnification of about 200,000) and the sidewall 40a of a 330-nm diameter silica wire 40 (at a magnification of about 700,000) formed in accordance with the teachings of the invention, show no visible irregularity in the surfaces of these wires, thereby corroborating high smoothness of these surfaces. In fact, as indicated above, the typical sidewall root mean square roughness of prototype wires formed by Applicants in accordance with the above method is less than 0.5 nm. The insert of FIG. 8 is an electron diffraction pattern of the silica wire, demonstrating that the wire is amorphous. It should be understood that the above exemplary experimental data, and the data presented in the discussions below, regarding silica wires formed in accordance with the teachings of the invention are presented for illustrative purposes and to show the efficacy of fabrication methods of the invention, and are not intended to necessarily indicate optimal silica fibers that can be obtained by practicing such methods. In particular, silica fibers having more uniform diameters and better surface smoothness may be fabricated by practicing the methods of the invention.

Figure 9:
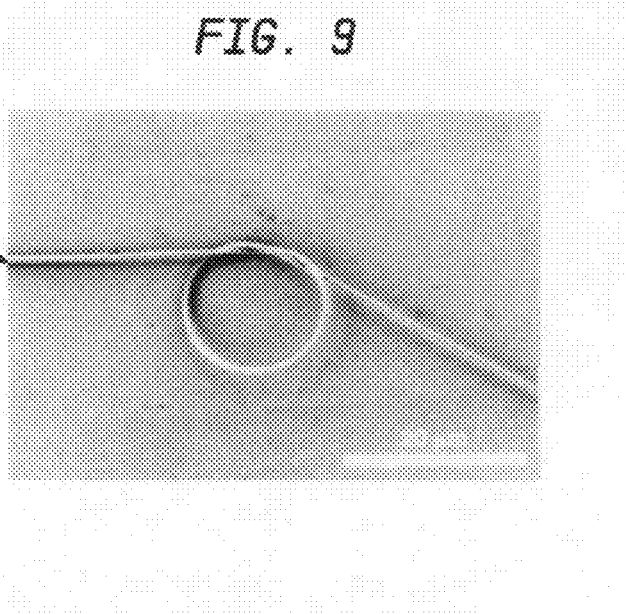
FIG. 9 is an SEM image of a 15-micrometer diameter micro-ring made with a 520-nm diameter silica wire fabricated in accordance with the teachings of the invention.
Figure 10:
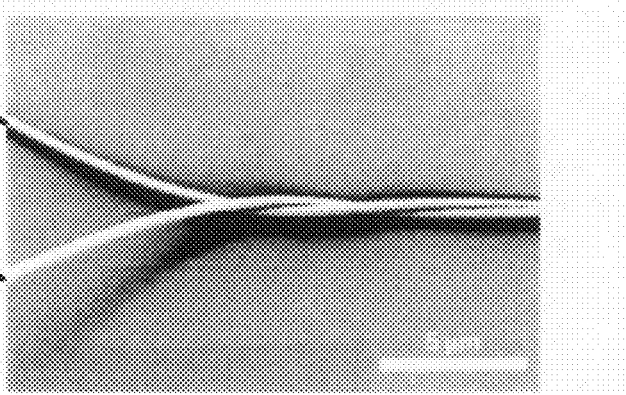
FIG. 10 is an SEM image of two twisted 330-nm diameter silica wires fabricated in accordance with the teachings of the invention.
Figure 11:
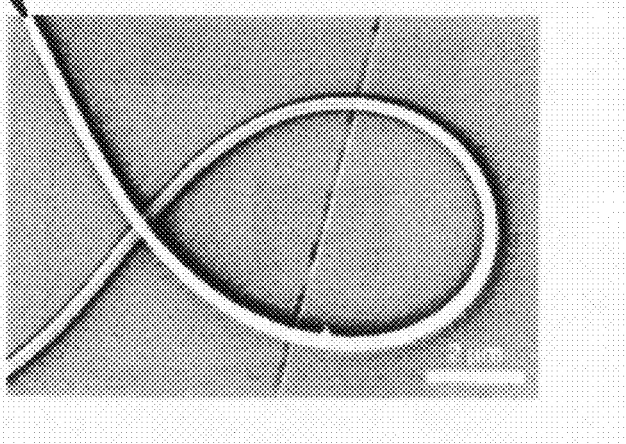
FIG. 11 is an SEM image of a bent 280-nm diameter silica wire with a bending radius of 2.7 micrometers, FIG. 12 schematically illustrates an experimental step-up for coupling light from a launching nanosized silica wire to a guiding nanosized silica wire via evanescent wave coupling.

The high flexibility and the extended length of silica SMNW of the invention facilitate their manipulation under an optical microscope to form a variety of topological shapes. By way of example, FIG. 9 shows a 520-nm diameter silica wire 42 that is elastically bent to form a microscopic ring having a diameter less than about 15 micrometers. Further, FIG. 10 shows two 330-nm diameter wires 44 and 46 that are twisted together. As shown in these figures, the silica wires do not break when bent and/or twisted, indicating that they have excellent flexibility and mechanical properties. In particular, a tensile strength of at least 2.5 GPa for the silica wire shown in FIG. 10 can be estimated by employing the Young's modulus of silica (73.1 GPa). Silica wires of the invention can be bent even more sharply than shown above. For example, FIG. 11 shows a 280-nm diameter silica wire 48 bent to a radius of about 2.7 micrometers, indicating that the wire has a tensile strength exceeding about 4.5 GPa. In fact, it has been found that the tensile strengths of prototype silica wires prepared in accordance with the teachings of the invention are typically higher than about 5.5 GPa. Further, bending radii of less than 1 micrometer upon plastic bending of some silica wires of the invention can be achieved.

Figure 12:
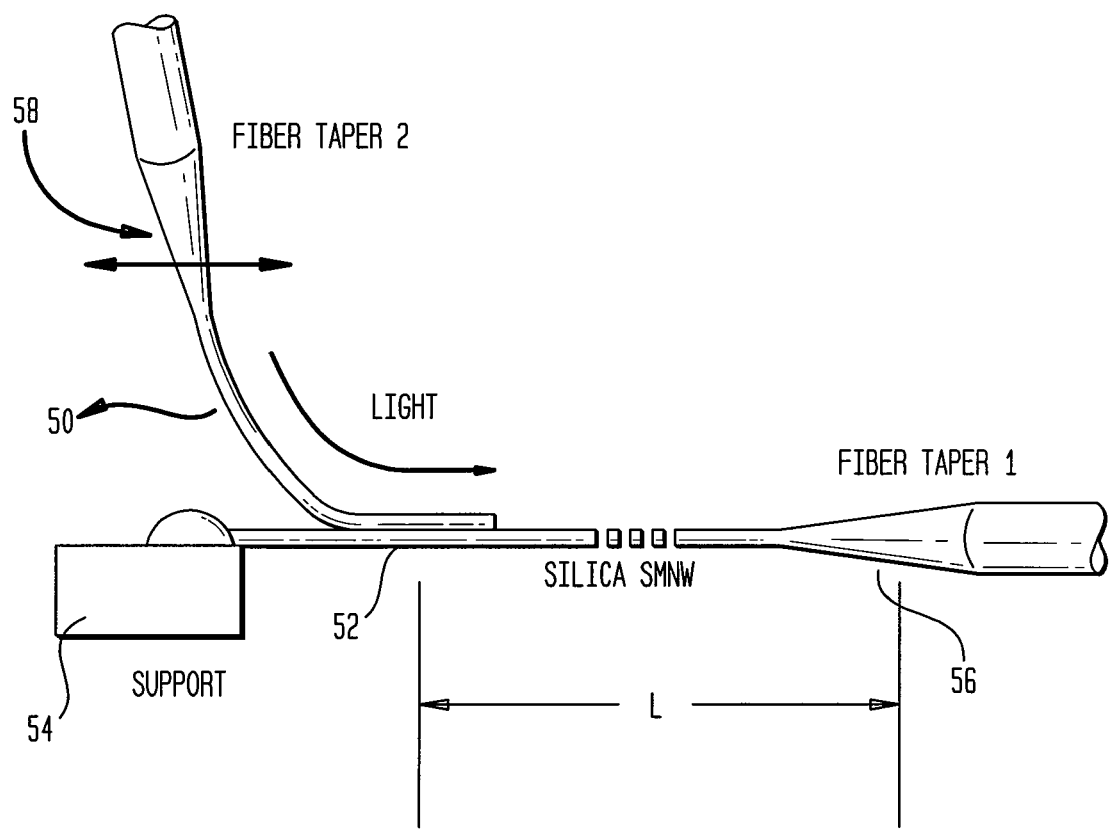

Sub-micrometer- or nanometer diameter silica wires of the invention find a variety of applications. For example, such wires can be utilized for transmission of electromagnetic radiation between two spatial locations. In other words, such silica wires can be employed as optical fibers for transmission of electromagnetic radiation. As discussed in more detail below, light can be coupled from an external source, e.g., another fiber, into a SMNW of the invention by employing evanescent wave coupling. For example, FIG. 12 schematically illustrates an exemplary experimental set-up for launching light from one SMNW 50 onto another SMNW 52 that can guide the coupled light to a desired location. More particularly, the SMNW 52 is suspended in air with one end fixed to a support 54, and the other end connected to a fiber taper 56 from which it was drawn. The launching wire 50, which is drawn from a second fiber taper 58, attaches itself to the guiding wire as a result of a van der Waals interaction between the wires. To reduce the interfering contribution from the light due to scattering, both fiber tapers were gold-coated except for the region utilized for evanescent wave coupling. The coupling of radiation from an external source (not shown) into the launching fiber can be readily achieved via the second fiber taper 58 that exhibits micrometer-sized cross-sectional diameter.

Figure 13:
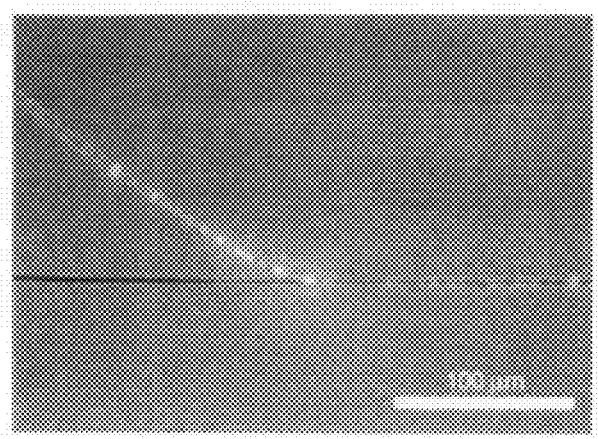
FIG. 13 is an optical microscope image of a 390-nm diameter taper coupling light into a 450-nm diameter silica wire.
Figure 14:
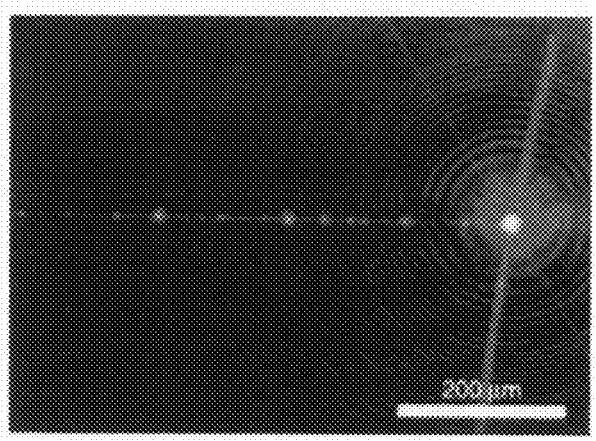
FIG. 14 is a long-time exposure micrograph of 633-nm wavelength light guided by a 360-nm diameter silica wire of the invention in air and intercepted by a 3-micrometer diameter guiding wire (on the right of the image)
Figure 15:
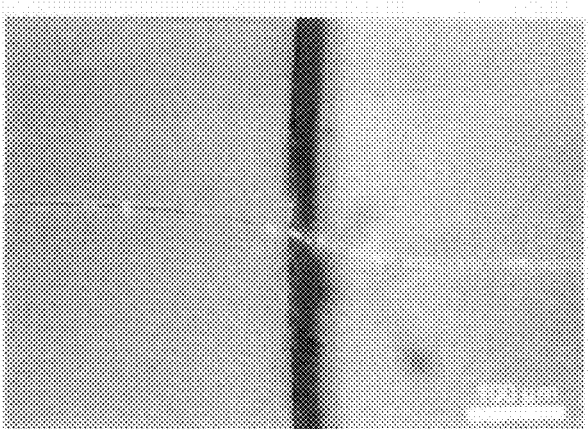
FIG. 15 is an optical microscope image of 633-nm wavelength light guided by a 550-nm diameter silica wire with its left half suspended in air and the right half placed on a $MgF_2$ crystal.

FIG. 13 shows an optical micrograph of coupling of light having a wavelength of 633 nm from a 390-nm diameter silica launching wire onto a 450-nm diameter silica wire, achieved by utilizing the above experimental set-up. FIG. 14 shows the interception of light guided by the 360-nm diameter wire (from left to right) by a supporting 3-micrometer wire (shown at the right of the image extending transversely to the guiding wire), thereby illustrating that the amount of light scattered by the wire is small compared to that guided by it. To further illustrate light propagation properties of SMNW's formed according to the teachings of the invention, FIG. 15 shows a 550-nm diameter wire guiding 633-nm light in air (on the left) and along a surface of a $MgF_2$ crystal (on the right). Because the refractive index of $MgF_2$ is lower than that of silica, the silica wire continues to guide the light on the $MgF_2$ surface, demonstrating the possibility of integrating SMNW's of the invention with low-index substrates for device applications. In some preferred embodiments, the silica nanowire can be mounted on a silica aerogel substrate, as discussed in more detail below.

In other applications, nano-sized silica wires of the invention can be employed for chemical and biosensing in liquid media. It has been demonstrated that a 620-nm diameter silica wire formed according to the teachings of the invention can guide light, e.g., light having a wavelength of 633 nm, in water micro-drops, thereby demonstrating the feasibility of utilizing the silica wires for such applications.

Figure 16:
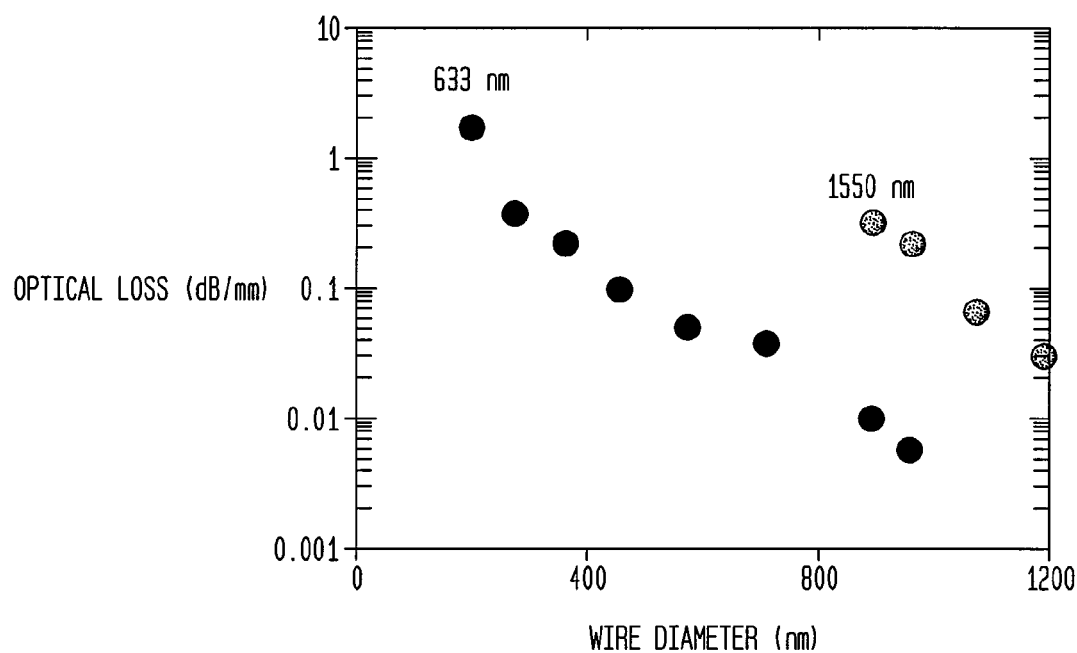
FIG. 16 presents graphs depicting experimentally measured optical loss of exemplary nanosized silica fibers fabricated in accordance with the teachings of the invention as a function of fiber length at two different transmission wavelengths.

FIG. 16 depicts two graphs illustrating experimentally obtained data for optical loss of a number of SMNW's of the invention as a function of wire diameter for radiation at two wavelengths of 633 nm and 1550 nm. The illustrated optical loss data was obtained by measuring optical transmission as a function of length L along the wire, e.g., between the coupling region and fiber taper 1 in experimental set-up shown in FIG. 12. Care was taken to maintain the same coupling efficiency between the launching and guiding wires. For example, when utilizing the experimental set-up of FIG. 12, the overlap between the launching wire and the guide wire, whose optical loss was measured, was adjusted until the light output from the fiber taper 56 was maximized.

With continued reference to the graphs of FIG. 16, the measured optical loss of a 190-nm diameter wire at a wavelength of 633 nm is about 1.7 dB/mm, which is much lower than the optical loss of many conventional sub-wavelength structures, such as metallic plasmon waveguides. Without being limited to any particular theory, the increasing optical loss with decreasing wire diameter, shown in the graphs, can be attributed to surface contamination. In particular, as the wire diameter is reduced below the wavelength of propagating light, more light is guided outside the wire's core as an evanescent wave, and is therefore more susceptible to scattering by surface contamination. In particular, calculations show that about 20% of energy propagates outside the silica core of a silica wire having a diameter of 450 nm at 633-nm wavelength, and outside the core of a silica wire having a diameter of 1100 nm at 1550-nm wavelength. For smaller diameters, a larger fraction of the energy transmitted by the wire propagates outside the core as an evanescent wave.

Evanescent wave propagation exhibited by nano-meter sized silica wires of the invention advantageously provides the possibility of effectively utilizing these wires in a variety of devices, such as optical sensors. Further, the high smoothness of the surface of a silica wire of the invention lowers scattering of such an evanescent wave as it propagates outside the wire core in proximity of the wire's outer surface, thereby reducing optical loss of transmission.

As discussed above, the SMNW's formed according to the teachings of the invention can be bent sharply without suffering fracture. In addition, light transmitted by the fibers can follow such sharp bends. In fact, because of a large index contrast between silica and air, silica SMNW's can be bent sharply without incurring large bending losses for transmission of optical energy. For example, 3-dimensional finite difference time domain simulations can be utilized to find that an air-cladded 450-nm diameter silica wire shows a bending loss of less than about 0.3 dB for a 90 degree turn with a bending radius of 5 micrometers for light at a wavelength of 633 nm.

Figure 17:
FIG. 17 is an optical microscope image of 633-nm light traveling through a sharp bend with a radius of 5.6 micrometers in a 510-nm diameter silica wire of the invention, FIG. 18 schematically depicts a silica nanowire assembled on a silica aerogel substrate according to the teachings of the invention.

As shown in FIG. 17, 633-nm wavelength light can be successfully guided through a bend having a 5.6 micrometer radius in a silica wire 60 having a diameter of about 510 nm. The observed intensity of the scattered light after the bend was not greatly reduced, thereby indicating a low bending loss.

Thus, the nano-sized silica wires of the invention are particularly suitable for use in applications in which tight waveguide bends are desired. For example, the ability to guide light through sharp bends can be especially useful for miniaturization of photonic devices. Microrings made for such wires can be incorporated into photonic devices, such as optical microresonators for optical communication or optical sensing. To illustrate the feasibility of utilizing such wires in photonic devices, a 950-nm diameter SMNW formed in accordance with the teachings of the invention was employed to form a ring with a 75-micrometer radius that exhibited a Q-factor of about 1500 at a wavelength of 1550 mm.

Figure 18:
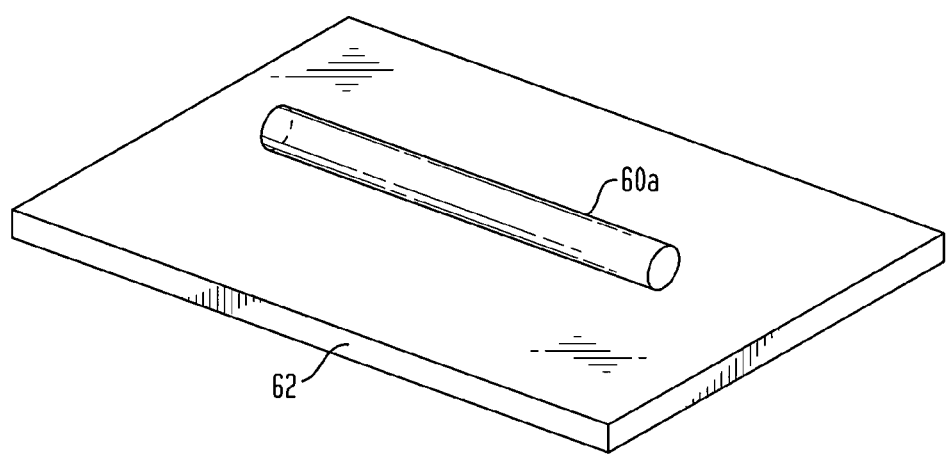

The nano-sized silica wires according to the teachings of the invention can be employed in a variety of microphotonic devices, such as linear waveguides, waveguide bends and branch couplers, as discussed in more detail below. In many of these applications, one or more nano-sized silica wires are mounted on a substrate having an index of refraction that is lower than that of the silica wires (preferably much lower than 1.45). By way of example, as shown schematically in FIG. 18, in one exemplary embodiment, a nano-sized silica wire 60a having an average diameter in a range of about 20 nm to about 1000 nm, and more preferably in a range of about 20 nm to about 200 nm, is mounted on a substrate 62 having an index of refraction less than about 1.4, e.g., in a range about 1 to about 1.1, and more preferably in a range of about 1 to about 1.05 (e.g., 1.03). In one preferred embodiment, the substrate 62 supporting the nano-sized silica wire 60 is formed of silica aerogel, which is a silicon-based solid with a porous, sponge-like structure. More specifically, silica aerogel can comprise a network of silica nanoparticles about 30 nm in size, much smaller than typical wavelengths of guided light, and can exhibit a transparent optical spectral range similar to that of silica. Silica aerogel, in which about 99 percent of volume can be air, is much less dense than glass (e.g., about 1000 times less dense), and has an index of refraction very close to that of air (e.g., an index of refraction of about 1.03). Because the difference between the index of refraction of aerogel and air (a difference of about 0.03) is much less than a difference between the index of refraction of silica SMNW and air (a difference of about 0.45), the optical guiding properties of silica aerogel-supported nano-meter sized silica wires are virtually identical to those of air-clad wires.

Although silica aerogel is identified herein as one example of suitable substrate, the substrate can be formed of aerogels of other materials, such as, alumina, tungsten oxide, ferric oxide and tin oxide.

Figure 19:
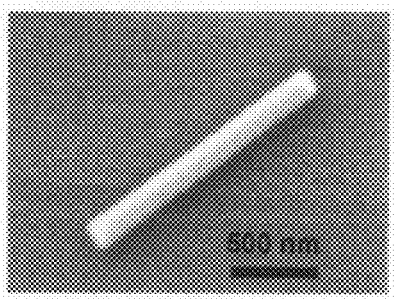
FIG. 19 is an SEM image of a 1.5 micron long silica wire segment cut from a wire according to one embodiment of the invention having a diameter of 160 nm, showing flat end faces of the wire segment.
Figure 20:
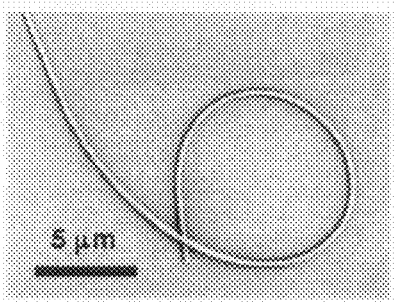
FIG. 20 is an SEM image of a 9 micron diameter loop on a sapphire substrate formed by elastic bending of a 200 micron diameter wire.

In some embodiments of the invention, the assembly of silica nanowires on a solid substrate and their manipulation (e.g., cutting them into a desired length) can be achieved by employing scanning tunneling microscope (STM) probes or other suitable microprobes. For example, using STM probes, silica SMNW can be cut, positioned, bent and twisted with high precision under an optical microscope. By way of example, in some embodiments of the invention, a bend-to-fracture method can be applied to cut a SMNW to a desired length by holding the wire with two STM probes on a substrate (e.g., silicon or sapphire substrate) and using a third probe to bend the wire to cause fracture at a desired point. This process leaves flat end faces at the fracture point even for a silica wire segment that is only about 1 micron in length, as shown in FIG. 19. When silica nanowires are placed on a substrate, e.g., a silica aerogel substrate, they are held tightly in place by the van der Waals attraction forces between the wires and the substrate. A silica nanowire can also be repositioned or elastically bent to a desired radius by using STM probes. By way of example, FIG. 20 shows a 200-nm diameter wire bent into a 9 micron diameter loop on a sapphire wafer. The wire maintains its bent shape after removing the STM probes as a result of friction between the wire and the substrate.

Figure 21:
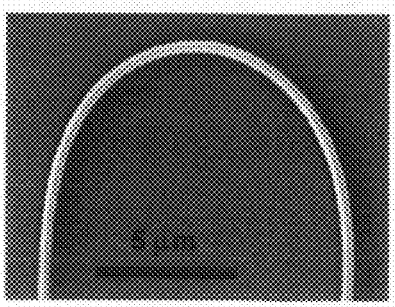
FIG. 21 is an SEM image of a 5-micron radius plastic bend from in a 410-nm silica wire mounted on a sapphire substrate in accordance with one embodiment of the invention.
Figure 22:
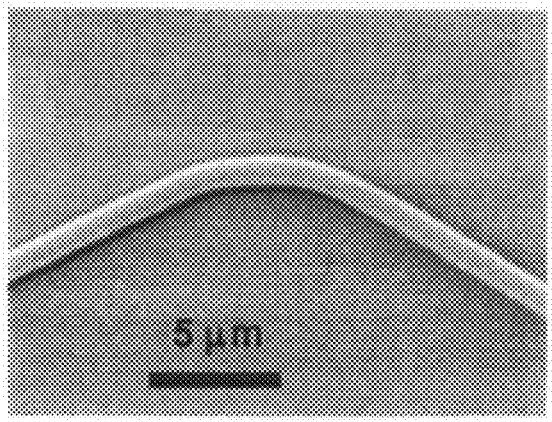
FIG. 22 is an SEM image of double plastic bends in a 940-nm diameter silica wire formed in accordance with one embodiment of the invention.
Figure 23:
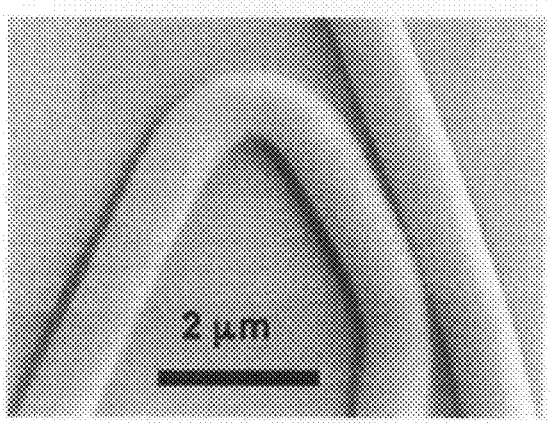
FIG. 23 is an SEM image of double plastic bends formed in an 800-nm diameter silica wire in accordance with one embodiment of the invention.

In some embodiments, to avoid long-term fatigue and fracture of an elastically bent wire due to bending stress, a bent wire can be annealed at an elevated temperature for a selected duration to cause a permanent plastic deformation of the wire without degrading surface smoothness or diameter uniformity. For example, the bent wire can be annealed at a temperature of about 1400 K in vacuum (e.g., $2 \times 10^{-3}$ Pa) for about two hours. Generally, such annealing does not affect the geometry of one or more nanowires assembled on a substrate because of the tight coupling between the wires and the substrate. This allows laying out a final design geometry of wires on a substrate before performing the high temperature annealing step. For example, FIG. 21 shows an SEM image of a 5-micron radius plastic bend in a 410-nm silica wire mounted on a sapphire substrate. The difference between the radii of the bend before and after annealing is less than about 0.5%, thus indicating that the annealing step does not significantly affect the pre-anneal geometry. The above process of bending a wire followed by annealing can be iterated to obtain very tight bends or multiple bends in nearby locations, as shown in exemplary SEM images presented in FIGS. 22 and 23 corresponding, respectively, to double plastic bends in a 940-nm diameter silica wire and double bends in an 800-nm diameter silica wire (the sharp bend has a radius less than about 1 micron).

The optical properties of silica nanowires of the invention can be theoretically investigated by numerically solving the Maxwell equations. Such calculations indicate a single mode propagation through a nano-sized silica wire having a normalized wire diameter $$\left(\frac{D}{\lambda_0}\right),$$

defined as a ratio of the wire's physical diameter (D) to the wavelength of propagating radiation ($\lambda_0$), that is less than about 0.73 (herein referred to as single-mode cut-off diameter). At the single-mode cut-off diameter $D_{SM}$ (e.g., 457 nm for propagating radiation having a wavelength of 633 nm), more than about 80% of the light energy is guided inside the wire. The remainder of the energy is guided as an evanescent wave. An exemplary distribution of the electric field intensity (calculated by employing a three-dimensional finite-difference time-domain method) across the cross-section of a 450-nm diameter silica wire bent to a radius of about 5 microns shows that there is virtually no leakage of light through such a tight bend. Further, exemplary calculations performed for coupling of light between two silica wires, each having a diameter of about 350 nm, that have an overlap of only 2.6 microns along a longitudinal portions thereof indicate that more than about 97% of light originally propagating in one wire can be transferred to the other. In other words, the wire can provide a tight confinement of light, while the evanescent wave propagating outside the wire can facilitate efficient coupling of light from one wire to another, launching of light into a wire, and building micrometer-sized optical couplers, as discussed in more detail below.

Silica nanowires according to the teachings of the invention can be utilized to transmit electromagnetic radiation having wavelengths over a broad spectral range as the ultraviolet (UV) and the infrared (IR) absorption edges of silica are, respectively, below 250 nm and beyond 2000 nm. For example, such nano-sized silica wires can transmit electromagnetic radiation with wavelengths in a range of about 250 to about 2000 nm, e.g., in a range of about 400 nm to about 1600 nm. Similarly, a SMNW bend can be employed over a broad range of wavelengths (from the ultraviolet to the infrared). Hence, silica nanowires of the invention provide much enhanced flexibility relative to photonic crystal structures that can operate only at specific wavelengths.

Figure 24:
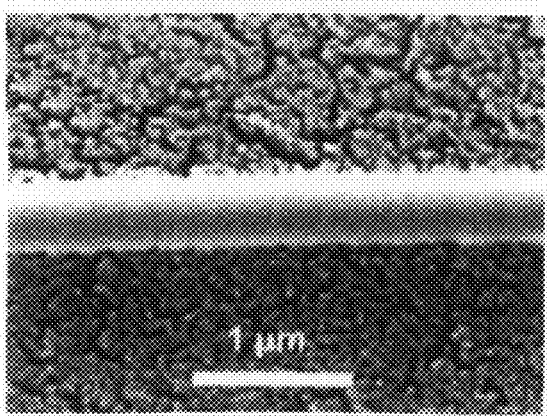
FIG. 24 is an SEM image of a 450-nm wide silica wire assembled on a silica areogel substrate in accordance with one embodiment of the invention.
Figure 25:
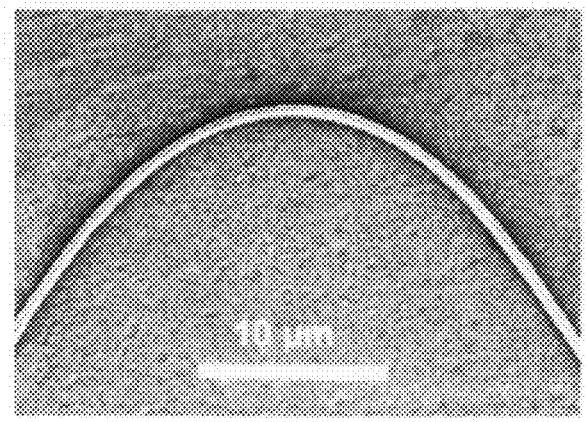
FIG. 25 is an SEM image of an aerogel-supported 530-nm diameter silica wire with a bending radius of 8 microns.
Figure 26:
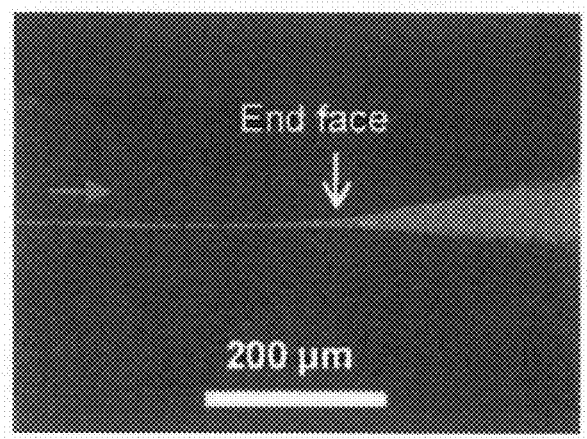
FIG. 26 is an optical microscopy image of a 380-nm diameter silica wire according to one embodiment of the invention, guiding radiation with a wavelength of 633 nm on a surface of a silica aerogel.

As noted above, in many preferred embodiments of the invention, silica nanowires can be mounted on a silica aerogel substrate. By way of example, FIG. 24 shows an SEM image of a 450-nm wide silica wire that is supported by a silica aerogel substrate while FIG. 25 shows an SEM image of an aerogel-supported 530-nm wide wire with a bending radius of 8 microns. A silica nanowire supported by a silica areogel substrate can efficiently transmit electromagnetic radiation. For example, FIG. 26 shows an optical microscopy image of a 380-nm diameter silica wire guiding radiation with a wavelength of 633 nm on a surface of a silica aerogel. As the propagating light moves beyond the end face of the wire, it spreads out and scatters on the aerogel surface. The uniform and substantially unattenuated propagation along the nearly 0.5 millimeters length of the wire and the strong output at the end face show low scattering relative to guided intensity.

Figure 27:
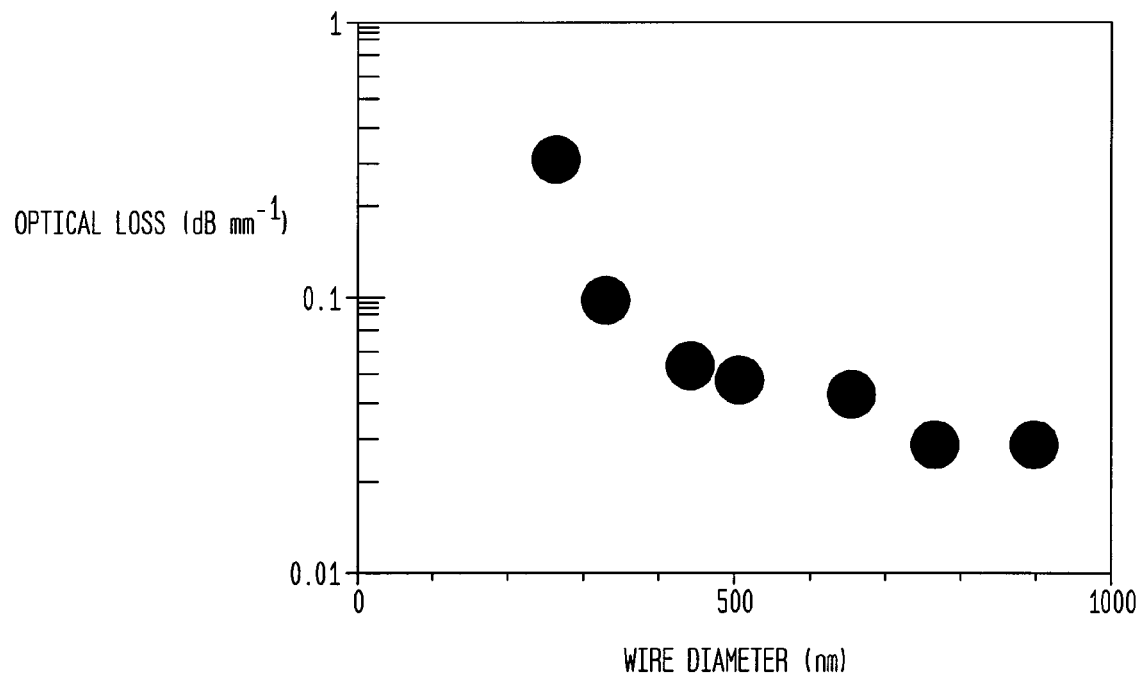
FIG. 27 presents optical loss data at a wavelength of 633 nm for exemplary illustrative straight silica wires supported by a silica aerogel substrate.

FIG. 27 presents optical loss data at a wavelength of 633 mm for exemplary illustrative straight silica wires supported by a silica aerogel substrate, indicating a low loss even at wire diameters less than 500 mm. In fact, for wires having a diameter close to $D_{SM}$, the measured optical loss is less than about 0.06 db/m. This measured low optical loss corroborates that the silica aerogel does not degrade the properties of the silica nanowires for guiding light, and opens the way of fabricating microphotonic devices based on the silica nanowires.

Figure 28:
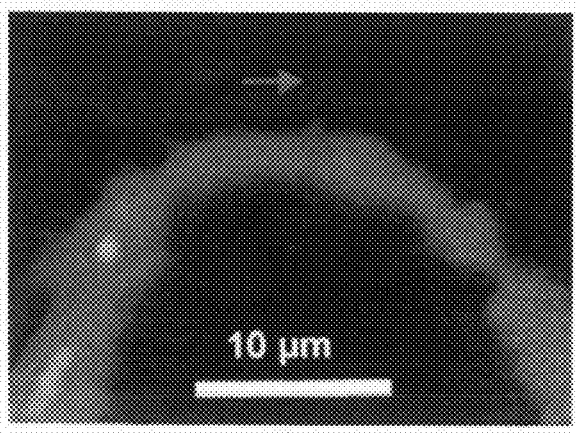
FIG. 28 shows an optical microscopy image of an exemplary 530-nm diameter silica wire supported on an aerogel silica substrate, guiding light having a wavelength of 633 nm around a bend with a radius of 8 microns.
Figure 29:
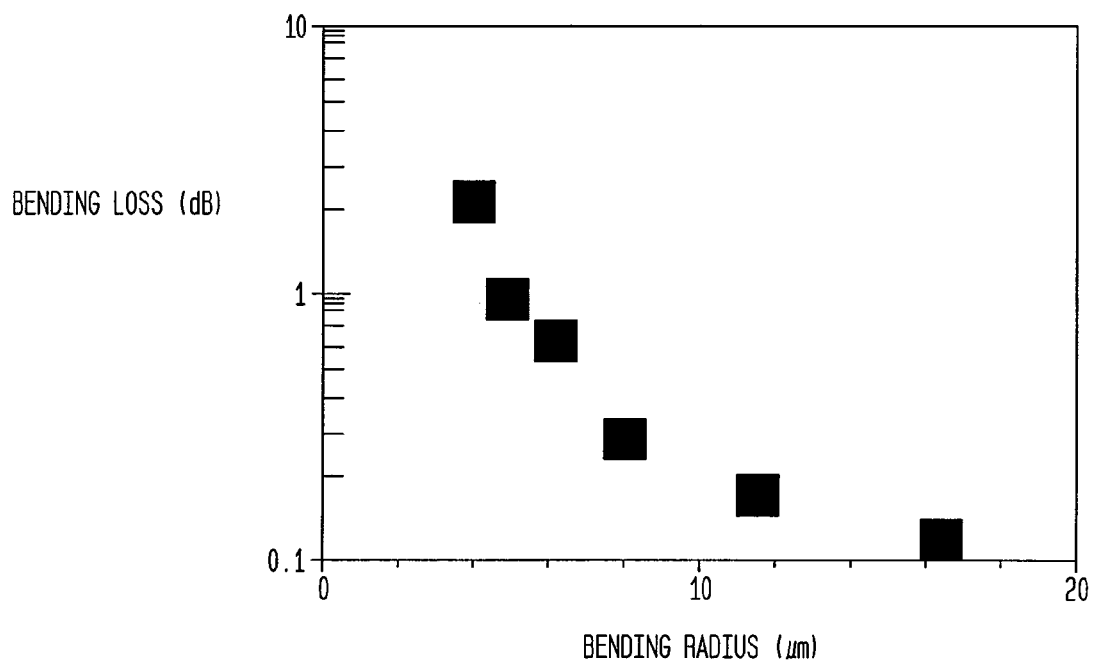
FIG. 29 presents data corresponding to measured optical loss as a function of bending radius in a 530 nm diameter silica wire supported on a silica aerogel substrate, FIG. 30 schematically depicts a microphotonic coupler formed of two silica wires supported on an aerogel substrate in accordance with one embodiment of the invention, FIG. 31 schematically depicts a microphotonic X-coupler formed of two bent silica nanowires assembled on a silica aerogel substrate in accordance with one embodiment of the invention, FIG. 32 schematically illustrates two silica nanowires assembled on a silica aerogel substrate that intersect one another at a substantially normal angle.

In addition to straight silica nanowires, bent wires supported on a silica gel can also be employed for efficient transmission of electromagnetic radiation. FIG. 28 shows an optical microscopy image of the 530-nm diameter silica wire supported on an aerogel silica substrate, as described above in connection with FIG. 25, guiding light having a wavelength of 633 nm around a bend with a radius of 8 microns. FIG. 29 presents data corresponding to measured optical loss as a function of bending radius in a 530 nm diameter silica wire, indicating that the losses are sufficiently small to be acceptable for incorporation of such bent wires in photonic devices. For example, the measured optical loss around a 5 micron radius bend is less than 1 dB. Hence, nanosized silica wires provide the advantages of compact overall size, low coupling loss, simple structure and easy fabrication. In contrast, bending waveguides based on planar photonic crystal structures not only require multiple periods, with concomitant increase in sizes of the structures, and complex fabrication techniques, but they also typically exhibit out-of-plane optical loss.

Figure 30:
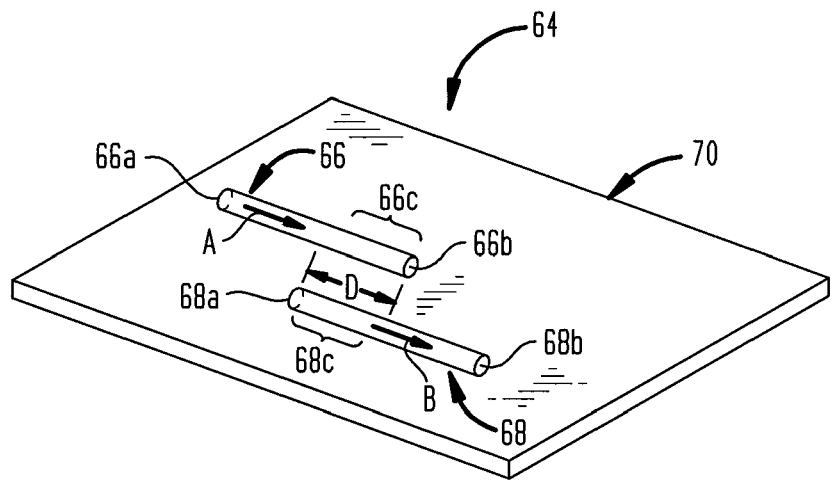

As noted above, silica nanowires according to the teachings of the invention can be employed as building blocks for fabricating microphotonic devices on a suitable substrate, e.g., a silica aerogel substrate. For example, FIG. 30 schematically depicts a microphotonic radiation coupler 64 comprising two straight silica nanowires 66 and 68 mounted on a silica aerogel substrate 70. The nanowire 66 extends from a proximal end 66a to a distal end 66b and the nanowire 68 extends from a proximal end 68a to a distal end 68b. The nanowires are disposed on the substrate 64 such that a distal portion 66c of the nanowire 66 has a length-wise contact (optical coupling) with a proximal portion 68c of the nanowire 68 over a distance D that is selected to as to cause coupling of radiation originally guided along one wire into the other wire. For example, radiation originally coupled via the proximal portion of the nanowire 66 and guided along this wire along a direction A (schematically depicted by an arrow) can be coupled into the proximal portion of the wire 68 to be guided towards its distal end 68b along a direction schematically designated by an arrow B. The overlap distance D can be in a range of about 1 micrometer to about 100 micrometers (e.g., in a range of about 2 to about 4 micrometers), or any other length suitable for providing an efficient coupling between the two wires.

Figure 31:
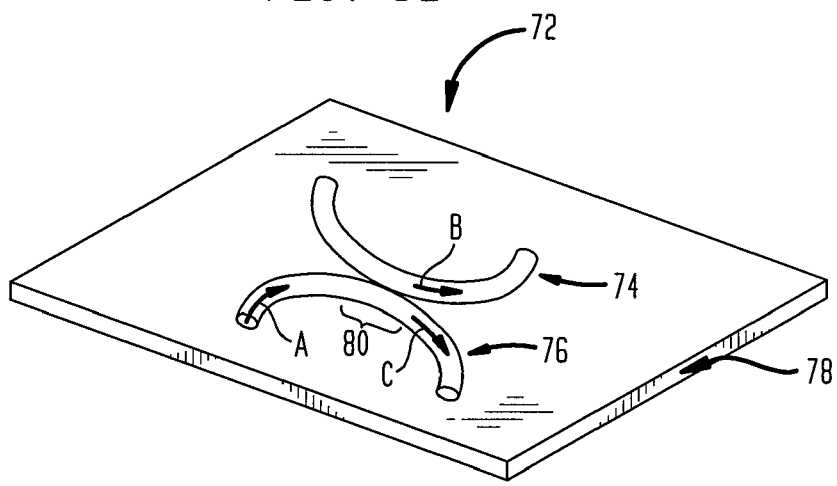

In another application, the silica nanowires according to the teachings of the invention can be utilized to fabricate microphotonic X-couplers. For example, FIG. 31 schematically depicts an X-coupler 72 formed of two bent silica nanowires 74 and 76 assembled on a silica aerogel substrate 78 so as to have an overlap (contact) along a portion 80, herein also referred to as an interaction region. Electromagnetic radiation originally launched into the nanowire 76 (or alternatively along the nanowire 74) along an arrow A is split by the optical coupling between the wires in the interaction region into two radiations flow paths, one primarily guided by the wire 74 along an arrow A, and the other guided by the wire 76 along an arrow C. In other words, the interaction region causes coupling of a fraction of radiation originally guided by one of the wires to the other wire while the remaining radiation continues its propagation along the wire initially guiding the radiation. The interaction region can have a length in a range of about 1 micrometer to about 100 micrometers (e.g., in a range of about 2 to about 4 microns). To illustrate the feasibility of forming such microphotonic X-couplers, a prototype X-coupler was formed of by two 420-nm diameter silica wire bends, assembled on a silica aerogel substrate, with an overlap of about 5 microns. The prototype X-coupler functioned as a 3-dB radiation splitter with an excess loss of less than 0.5 dB. By changing the overlap between the two bends over a range of about 3 microns, it is possible to tune the splitting ratio of such a coupler (a fraction of radiation coupled from one wire to the other) from less than 5% to more than 90%. Hence, the silica nanowires of the invention can be utilized to develop tunable microphotonic devices, such as tunable couplers and switches.

Couplers assembled with SMNWs according to the teachings of the invention provide a number of advantages over conventional microscopic couplers, such as fused couplers made from fiber tapers using conventional methods that typically require a much longer interaction length (e.g., of the order of 100 microns). In comparison with such conventional couplers, utilizing SMNWs to assembler coupler can result in reducing coupler size by more than an order of magnitude.

Figure 32:
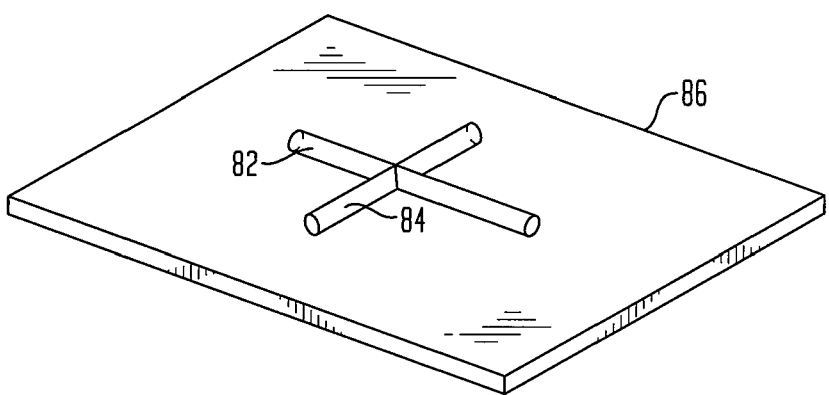
Figure 33:
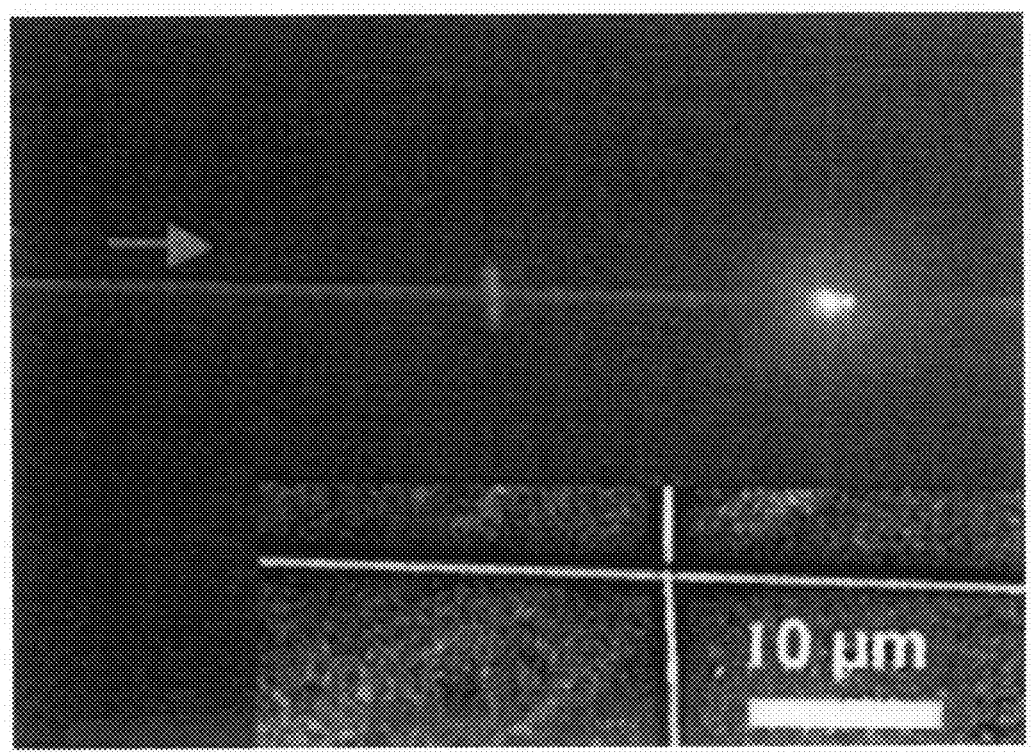
FIG. 33 is an optical microscopy image of two 390-nm diameter silica wires supported by a silica aerogel substrate intersecting one another perpendicularly, into one of which light having a wavelength of 633-nm is launched, FIG. 34 schematically illustrates a silica nanowire according to one embodiment of the invention doped with a selected dopant.

In some microphotonic devices, two silica nanowires mounted on a silica aerogel substrate, or any other suitable substrate, can intersect with one another, e.g., at a right angle (90 degree angle), as shown schematically in FIG. 32 (showing nanowires 82, 84 assembled on an aerogel substrate 86), with minimal cross-talk between the wires. For example, FIG. 33 is an optical microscope image of two 390-nm diameter silica nanowires supported by a silica aerogel substrate that intersect perpendicularly, into one of which (the horizontal wire) light having a wavelength of 633-nm is launched. Except for some weak scattering at the intersection of the wires, virtually no light is coupled from the horizontal wire to the vertical one. A measured cross-talk between the two wires is about −35 dB. The intentionally induced strong scattering on the right side of the horizontal wire provides a qualitative indication of the relative intensity of the guided light. Intersecting silica wires with larger diameters can exhibit even better isolation. Hence, although light can be readily coupled between two silica nanowires, e.g., by providing a longitudinal overlap between the wires as discussed above, vertically intersecting wires do not cause an "optical shortcut." This lack of cross-talk between vertically intersecting wires is particularly advantageous for high-density optical integration.

Figure 34:
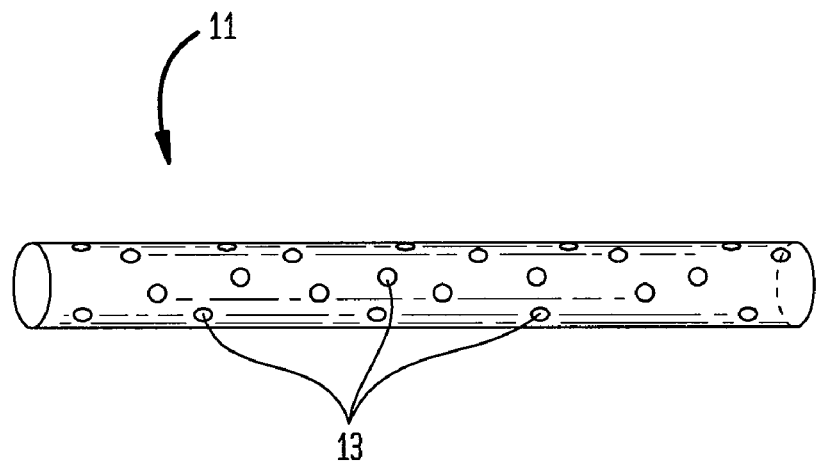

With reference to FIG. 34, in some embodiments of the invention, a nano-sized silica fiber 11 having cross-sectional diameters in a range of about 20 nm to about 1000 nm can be doped with a selected dopant 13. Such doped fibers can be employed in a variety active devices. For example, the dopants can be chosen to provide, for example, photoluminescence or lasing centers. Alternatively, the doped nano-sized silica fibers can be utilized to fabricate wavelength multiplexers. By way of example, in some embodiments, the dopants can comprise Erbium ions (e.g., $Er^{+3}$). Other possible dopants include, without limitation, $Nd^{+3}$ and $Yb^{+3}$. In one method of forming such doped nanowires, doped silica fibers having larger diameters (e.g., micron-sized diameters) can be drawn by utilizing the methods described herein to form nanowires having diameters in a range of about 20 nm to about 1000 nm.

Figure 35:
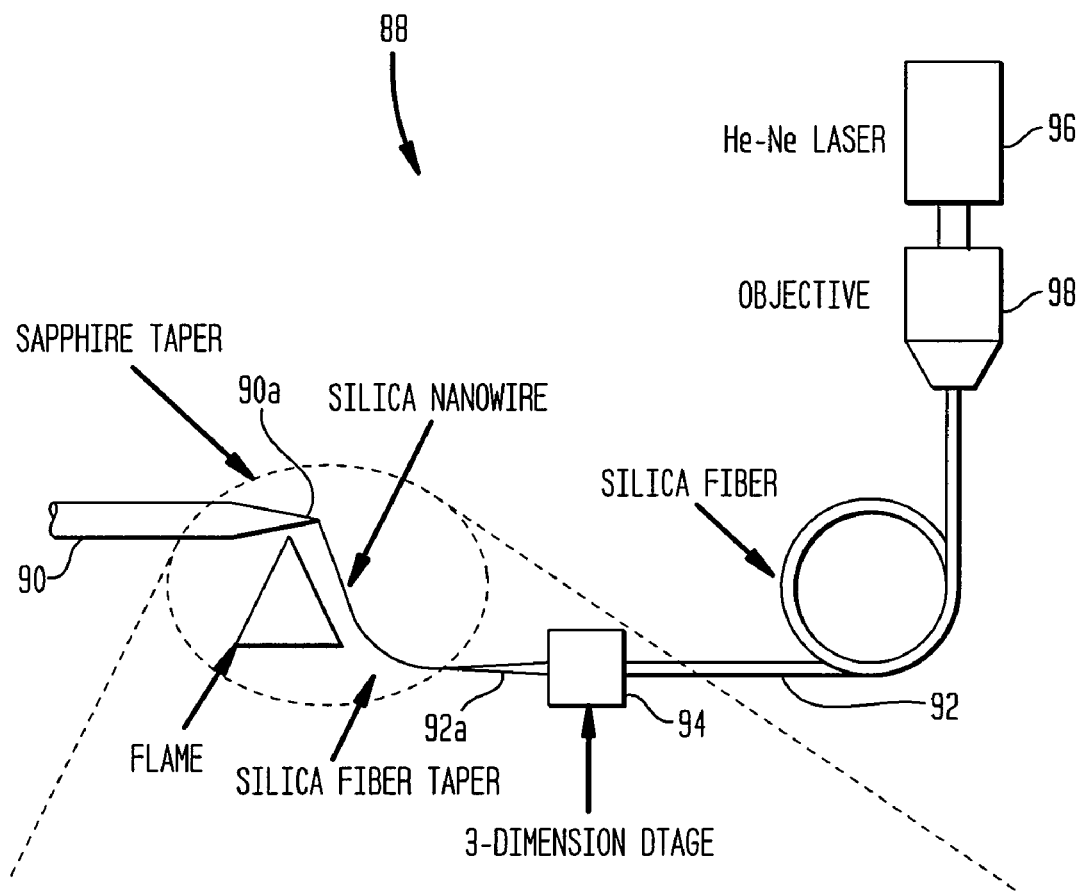
FIG. 35 is a schematic diagram of a self-modulated taper drawing system according to one embodiment of the invention that is suitable for generating nano-sized silica fibers, FIG. 36 schematically illustrates self-modulation realized in a method according to one embodiment of the invention for drawing a nano-sized silica fiber from a larger diameter fiber.

A two-step process for fabricating silica nanowires having nano-meter sized diameters was discussed above. In another embodiment, the silica nanowires are formed by employing a self-modulated taper-drawing process, discussed in more detail below. FIG. 35 schematically illustrates a self-modulated taper-drawing system 88 according to this embodiment of the invention that is suitable for generating nano-sized silica wires. The System 88 includes a tapered sapphire rod 90 having a tip portion 90a. Initially, a standard single-mode silica fiber 92 is heated and drawn to cause a portion thereof to form a micrometer-diameter wire coupled to the remainder of the fiber through tapered segment 92a. A portion of the micrometer-diameter wire is wrapped about the tip of the sapphire rod, and the silica fiber (to which the wire is connected through a taper) is made substantially parallel to the sapphire rod without breaking the connection between the silica wire and the sapphire taper. A 90 degree bend is then made close to the tapered segment, e.g., by tightening the wire, so as to generate a tensile force along the wire, which can be used for self modulation. In this exemplary embodiment, a three-dimensional stage 94, to which an end of the standard fiber close to the tapered segment is anchored, can be employed to facilitate formation of the bend and the subsequent drawing step. The exemplary system 88 also includes a 30-mW continuous-wave He—Ne laser 96 (633-nm wavelength) to launch light, via an objective lens 98, into the silica fiber, the fiber taper, the micro-sized fiber and the wire being drawn so as to facilitate real-time monitoring and controlling of the drawing process.

Figure 36:
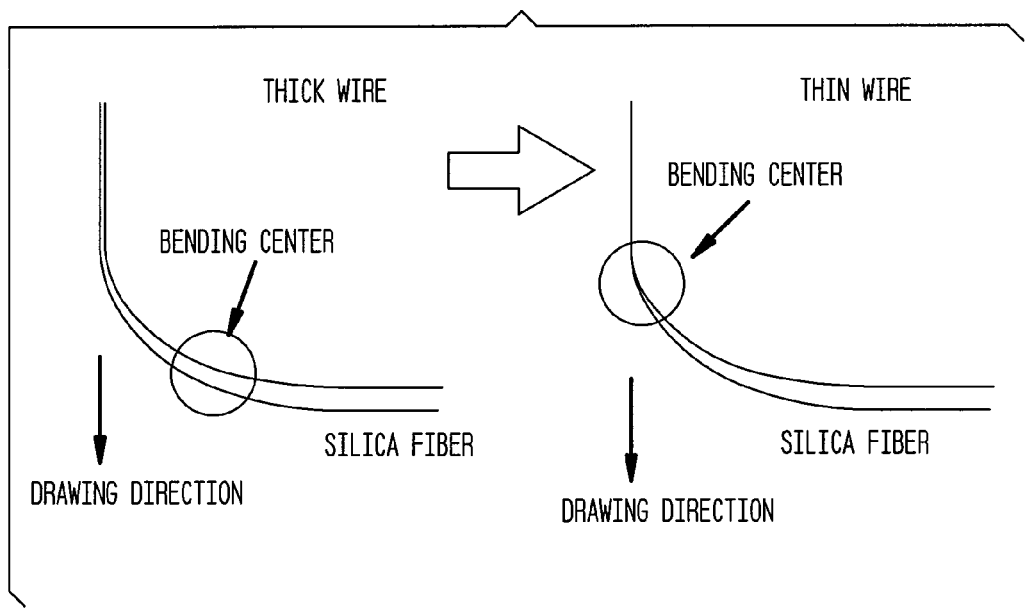
Figure 37:
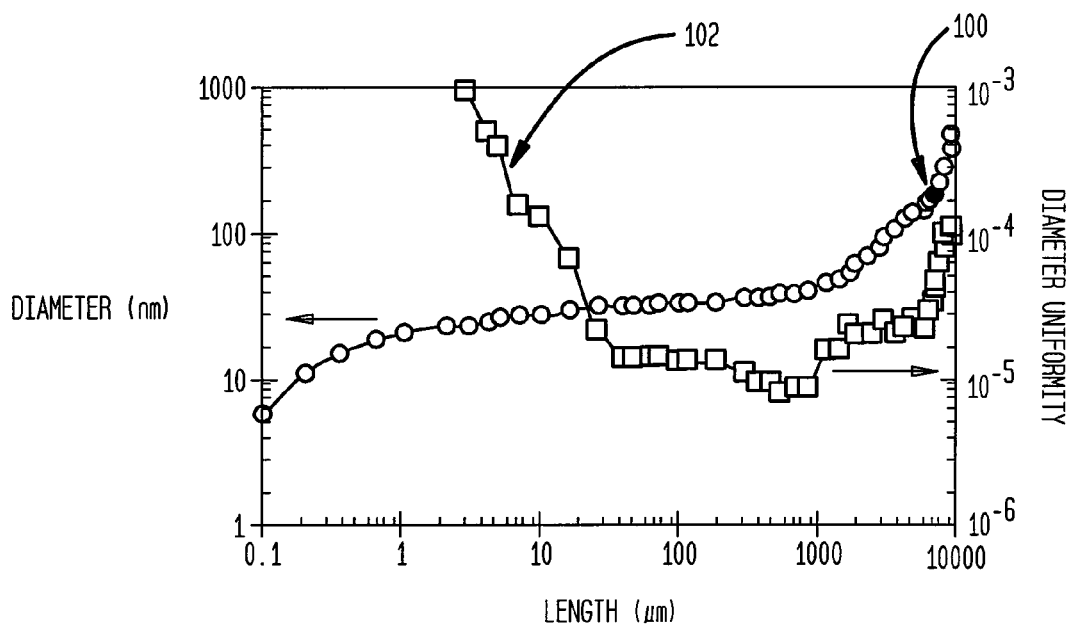
FIG. 37 presents graphs corresponding to measured diameter and diameter uniformity of prototype nano-sized silica fiber as a function of length.

Since the sapphire taper is much thicker and stiffer that the silica fiber taper, the elastic bend occurs at the tapered segment. The weight of the vertical portion of the silica wire can cause the wire to be drawn as the tip portion of the sapphire rod is heated (e.g., via a flame applied to a portion of rod a selected distance from the tip) to cause softening of the wire wrapped around the tip. The temperature of the tip portion can be in a range of about 1500 C to about 1800 C (e.g., 1600 C). Initially, the drawing force can be relatively large as the wire has substantially its initial diameter. However, as the drawing continues, the diameter of the wire decreases and the fiber bend moves from the thicker end of the fiber taper to its thinner end, resulting in a smaller drawing force, as shown schematically in FIG. 36. In this manner, the force is modulated to allow drawing wires having very small and uniform diameters. In addition, in case of unpredictable changes in drawing conditions (for example, a slight temperature fluctuation that may cause a variation in viscosity of silica), the center of the elastic bend can shift to modulate the drawing speed to prevent a variation in wire diameter or its breakage. A drawn wire can include three parts: a first tapered end (typically millimeters long), a uniform segment (up to centimeters), and a second abruptly tapered end The above self-modulated taper drawing technique was employed to generate silica wires having diameters as small as about 20 nanometers. FIG. 37 presents graphs 100 and 102 corresponding, respectively, to measured diameter (D) and diameter uniformity ($U_D$) as a function of length for a prototype nano-sized silica wire fabricated by employing the above self-modulated taper drawing process. The diameter uniformity ($U_D$) is defined as $$\frac{\Delta D}{L},$$

where L designates a length over which the wire exhibits a diameter deviation ($\Delta D$) from a central, or an average, diameter D. Although the wire exhibits a monotonously tapering tendency on the whole, its uniform portions shows a very high degree of diameter uniformity. For example, at D=30 nm, the diameter uniformity ($U_D$) is about $1.2 \times 10^{-5}$. In other words, the maximum diameter difference between the two ends of a wire, having a length of 80 microns and a diameter centered around 30 microns, is less than about 1 micron. Even for a very thin wire having a diameter centered around 20 nm, the diameter uniformity ($U_D$) can be less than $10^{-3}$. It should be understood that the above data are provided only for illustration purposes, and the fabrication methods of the invention can also be employed to generate wires having smaller diameters and better diameter uniformity than those described above.

Silica nanowires formed according to the teachings of the invention also exhibit smooth sidewalls. For example, high resolution TEM was employed to measure a root-mean-square roughness of less than about 0.2 nm for the sidewall of a prototype 35-nm diameter silica nanowire fabricated by utilizing the above self-modulated taper drawing process. Considering that the length of an Si—O bond is about 0.16 nm, such a low sidewall roughness indicates an atomic-level smoothness of the wire surface. In addition, an electron diffraction pattern of this nanowire indicates an amorphous composition.

Figure 38:
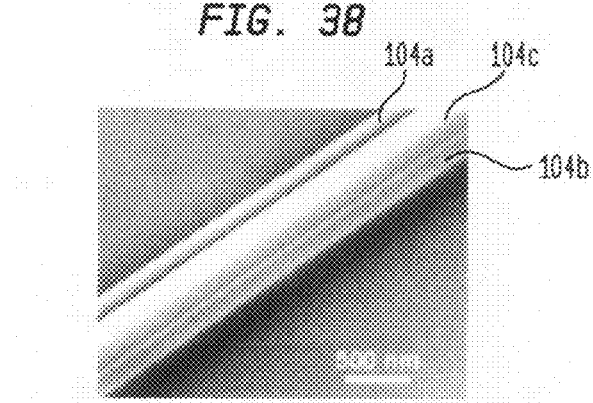
FIG. 38 is an SEM image of a silica bundle formed of three silica nanowires.

In some applications, the silica nanowires of the invention can be employed to form a nanowire bundle, e.g., by attaching them by utilizing van der Waals attractive forces. By way of example, FIG. 38 shows an SEM image of three silica nanowires 104a (30-nm diameter), 104b (140-nm diameter) and 104c (510-nm diameter) that are attached to one another along their lengths via van der Waals attraction to form a nanowire bundle.

Figure 39:
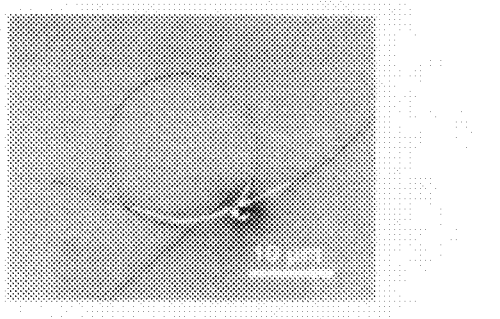
FIG. 39 shows an SEM image of an 18 micron diameter loop assembled with a 65-nm diameter silica nanowire.
Figure 40:
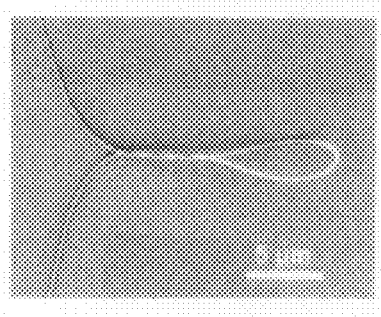
FIG. 40 shows an SEM image of a rope-like twist formed with a 120-nm diameter silica nanowire on a silicon substrate.
Figure 41:
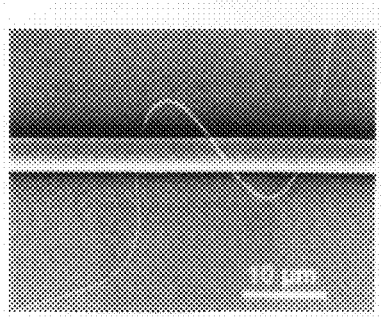
FIG. 41 presents an SEM image of a 150-nm diameter silica nanowire wrapped around a 4 micron diameter fiber to form a spiral coil.

The microphotonic applications of silica nanowires of the invention are not limited to those described above. As another example, FIG. 39 shows an SEM image of an 18 micron diameter loop assembled with a 65-nm diameter silica nanowire, which can be used as anoring for optical and mechanical purposes. By way of other examples, FIG. 40 shows an SEM image of a rope-like twist formed with a 120-nm diameter silica nanowire on a silicon substrate while FIG. 41 presents an SEM image of a 150-nm diameter silica nanowire wrapped around a 4 micron diameter fiber to form a spiral coil, which can be incorporated in nanodevices, e.g., as a nanospring.

Those having ordinary skill in the art will appreciate that various changes can be made to the above embodiments without departing from the scope of the invention. For example, the support element can be formed from materials other than those described above, and a variety of heat sources can be employed for heating the support element.

What is claimed is:

1. A microphotonic coupler, comprising
 a substrate having an index of refraction in a range of about 1 to about 1.4, and
 two silica fibers assembled on said substrate, each fiber having a proximal end and a distal end and an average diameter in a range of about 20 nm to about 1000 nm, a distal portion of the first fiber being in length-wise contact with a proximal length portion of the second fiber such that radiation guided by the first fiber can couple at said contact to the second fiber.

2. The microphotonic coupler of claim 1, wherein said substrate has an index of refraction in a range of about 1 to about 1.1.

3. The microphotonic coupler of claim 1, wherein said substrate comprises silica aerogel.

4. The microphotonic coupler of claim 1, wherein said substrate has an index of refraction in a range of about 1 to about 1.05.

5. The microphotonic coupler of claim 1, wherein said substrate has an index of refraction in a range of about 1 to about 1.03.

6. The microphotonic coupler of claim 1, wherein at least one of said silica fibers has an average diameter in a range of about 20 nm to about 200 nm.

7. The microphotonic coupler of claim 1, wherein at least one of said silica fibers has an average diameter in a range of about 20 nm to about 100 nm.

8. The microphotonic coupler of claim 1, wherein at least one of said silica fibers has an average diameter in a range of about 20 nm to about 50 nm.

9. The microphotonic coupler of claim 1, wherein said length-wise contact is over a distance in a range of about 1 micron to about 100 microns.

* * * * *